(12) United States Patent
Jeon et al.

(10) Patent No.: US 12,367,724 B2
(45) Date of Patent: Jul. 22, 2025

(54) ACCESS CARD PROCESSING METHOD AND APPARATUS FOR PERFORMING SAID METHOD

(71) Applicant: KAKAO CORP., Jeju-si (KR)

(72) Inventors: Hyeon Su Jeon, Seongnam-si (KR); Yong Woon Lee, Seongnam-si (KR); An Na Cho, Seongnam-si (KR); Seung Hyun Ko, Seongnam-si (KR); Seung Yeop Yeom, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 18/562,275

(22) PCT Filed: May 18, 2022

(86) PCT No.: PCT/KR2022/007093
§ 371 (c)(1),
(2) Date: Nov. 17, 2023

(87) PCT Pub. No.: WO2022/245119
PCT Pub. Date: Nov. 24, 2022

(65) Prior Publication Data
US 2024/0242554 A1 Jul. 18, 2024

(30) Foreign Application Priority Data
May 18, 2021 (KR) .................. 10-2021-0064405

(51) Int. Cl.
*G07C 9/27* (2020.01)
*H04L 51/04* (2022.01)

(52) U.S. Cl.
CPC .............. *G07C 9/27* (2020.01); *H04L 51/04* (2013.01)

(58) Field of Classification Search
CPC .................................. G07C 9/27; H04L 51/04
See application file for complete search history.

(56) References Cited

U.S. PATENT DOCUMENTS

| | | | |
|---|---|---|---|
| 12,020,525 B2 * | 6/2024 | Kwok | G07C 9/253 |
| 2011/0178928 A1 | 7/2011 | Carmichael et al. | |
| 2013/0166662 A1 * | 6/2013 | Daigle | H04L 12/58 709/206 |

(Continued)

FOREIGN PATENT DOCUMENTS

| | | |
|---|---|---|
| KR | 10-2008-0059991 A | 7/2008 |
| KR | 10-2012-0087336 A | 8/2012 |
| KR | 101273528 B1 | 6/2013 |

(Continued)

OTHER PUBLICATIONS

Office Action, dated Apr. 6, 2023, for Korean Patent Application No. 10-2021-0064405. 1 (16 pages) (with English Translation).

*Primary Examiner* — Sonji N Johnson
(74) *Attorney, Agent, or Firm* — Seed IP Law Group LLP

(57) ABSTRACT

Disclosed are an access card processing method and an apparatus for performing the method. The access card processing method may, if a produced access card is issued by a partner terminal and then transferred/retransferred, or a user terminal holding the access card returns the access card, or the access card is retrieved by the partner terminal, provide a message related to the transfer/return/retrieval so as to enable a situation regarding the transfer/return/retrieval to be recognized.

18 Claims, 22 Drawing Sheets

(56) References Cited

U.S. PATENT DOCUMENTS

2013/0292467 A1* 11/2013 Avs ........................ G07C 9/22
                                                                              235/382
2020/0349520 A1* 11/2020 Mughal ............... H04L 63/0823

FOREIGN PATENT DOCUMENTS

| KR | 10-2015-0122554 A | 11/2015 | |
|---|---|---|---|
| KR | 10-2019-0020273 A | 2/2019 | |
| KR | 10-2019-0040601 A | 4/2019 | |
| KR | 10-2019-0074850 A | 6/2019 | |
| KR | 10-2019-0124571 A | 11/2019 | |
| KR | 102331159 B1 | 11/2021 | |
| WO | WO-2021036894 A1 * | 3/2021 | ............. G06Q 10/10 |

* cited by examiner

<Partner management page>

| Partner basic information | | | Partner account information | |
|---|---|---|---|---|
| Partner name | Company ABC | | Total amount charged | 1,000,000 Won |
| Date of generation of partner | 2019.08.30 | | Price for issuance of access card | 1,000 Won |
| Manager information | Gil-dong Hong /xxx#kakao.com | | Number of access cards issued | 100 |
| Number of access cards | 10 | | Current balance | 90 |

Access card list    Create new

| Access card name | Classification | Validity period | Number of productions | Number of issuances | Card management |
|---|---|---|---|---|---|
| X square access card | Pass | 2020.01~07 | 100 | 50 | View/Edit |
| Employee card of Y department | Employee ID card | 2020.01~2021.01 | 30 | 20 | View/Edit |
| Membership card of club Z | Membership | 2020.12~2021.12 | 20 | 10 | View/Edit |

FIG. 7

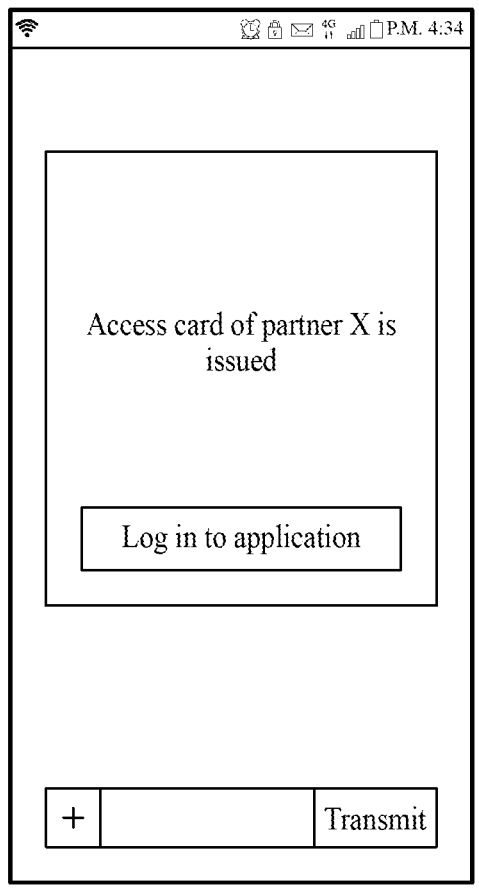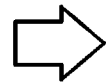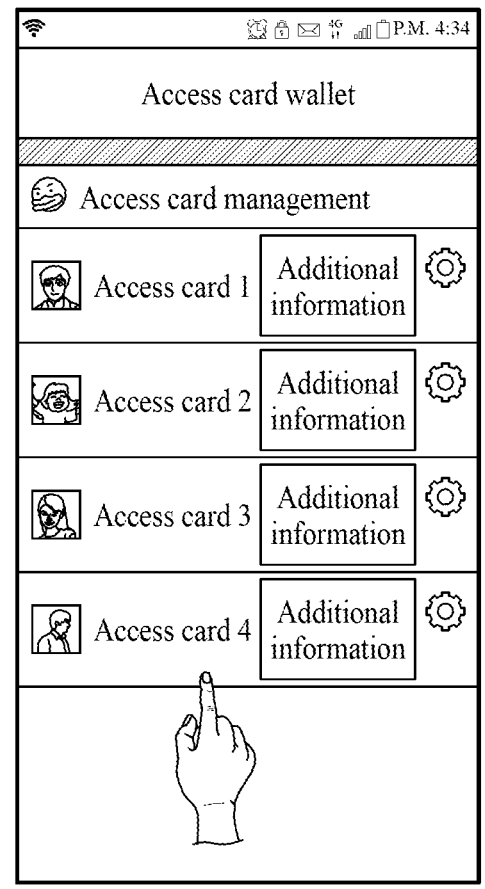
FIG. 11A　　　　　　　　FIG. 11B

ACCESS CARD PROCESSING METHOD AND APPARATUS FOR PERFORMING SAID METHOD

BACKGROUND

Technical Field

The present disclosure relates to an access card processing method of transferring, returning, or retrieving an access card and an apparatus for performing the method.

Description of the Related Art

Users engage in various activities through online and offline areas. For example, a user enters the office to go to work at 9 a.m. by tagging an employee identification (ID) card, goes to the gym to do workout at 12 p.m. by presenting a membership card as a member of the gym, purchases a ticket on an online website at 6 p.m., chats with friends on a chatroom at 7 p.m., and passes through the entrance of an apartment to get home at 9 p.m. by tagging an access card on the entrance.

BRIEF SUMMARY

Technical Goals

At this time, when the user logs in from an online area or enters in an offline area, there may be a need for access only when the user has particular qualifications. The inventors of the present disclosure have appreciated that there is a need for a method for a user to collectively manage qualifications for access required for various online or offline activities through a user terminal.

The present disclosure provides a method and apparatus for a user to more easily and conveniently issue and manage an access card required for online and offline access through an application.

The present disclosure provides a method and apparatus for accessing a particular online or offline area related to a partner through an access card required to access the area by managing an access card generated by the partner through an application installed on a user terminal.

The present disclosure provides a method and apparatus for allowing to transfer, return, and retrieve an access card generated by a partner, thereby improving usability of the access card.

Technical Solutions

An access card processing method performed by an access card management server according to an embodiment of the disclosure includes setting functions for transfer, return, or retrieval of an access card produced by a partner terminal, receiving a transfer request, a return request, or a retrieval request for the access card, processing the access card based on the received transfer request, return request, or retrieval request, and recording a processing history of the access card. The access card is a virtual card indicating qualifications to enter an online area or an offline area set by the partner terminal.

The receiving of the transfer request, the return request, or the retrieval request for the access card may include receiving the transfer request from a user terminal of a first user account corresponding to a transferor of the access card, and the processing of the access card may include mapping an access card mapped to the first user account to a second user account corresponding to a transferee in response to the transfer request.

An instant message including information related to transfer of the access card may be transmitted to at least one of the partner terminal, the user terminal of the first user account corresponding to the transferor, or a user terminal of the second user account corresponding to the transferee, and the instant message may be provided through a chatroom identified as a business entity of the partner terminal or the access card management server.

The information related to the transfer may include at least one of a type of the access card related to the transfer, a transfer time point of the access card, or information on the user terminal of the first user account or the user terminal of the second user account.

The receiving of the transfer request, the return request, or the retrieval request for the access card may include receiving the return request from the partner terminal for the access card or a user terminal of a first user account corresponding to a transferee, and the processing of the access card may include mapping an access card mapped to the first user account to a second user account corresponding to a transferor or a user account of the partner terminal in response to the return request.

An instant message including information related to return of the access card may be transmitted to at least one of the partner terminal, the user terminal of the first user account corresponding to the transferee, or a user terminal of the second user account corresponding to the transferor, and the instant message may be provided through a chatroom identified as a business entity of the partner terminal or the access card management server.

The information related to the return may include at least one of a type of the access card, a return time point of the access card, or information on the user terminal of the first user account or the user terminal of the second user account.

The receiving of the transfer request, the return request, or the retrieval request for the access card may include receiving the retrieval request from the partner terminal for the access card or a user terminal of a first user account corresponding to a transferor, and the processing of the access card may include mapping an access card mapped to a second user account corresponding to a transferee to the first user account corresponding to the transferor or a user account of the partner terminal in response to the return request.

An instant message including information related to retrieval of the access card may be transmitted to at least one of the partner terminal, the user terminal of the first user account corresponding to the transferor, or a user terminal of the second user account corresponding to the transferee, and the instant message may be provided through a chatroom identified as a business entity of the partner terminal or the access card management server.

The information related to the retrieval may include at least one of a type of the access card, a retrieval time point of the access card, information on the user terminal of the first user account or the user terminal of the second user account, or a reason for the retrieval.

An access card processing method performed by an access card management server according to an embodiment of the disclosure includes receiving an execution condition for transfer, return, or retrieval of an access card produced from a partner terminal, determining whether the execution condition for the transfer, the return, or the retrieval of the access card is satisfied, processing the access card based on the received execution condition for the transfer, the return, or the retrieval, and recording a processing history of the access card. The access card may be a virtual card indicating qualifications to enter an online area or an offline area set by the partner terminal.

The processing of the access card may include mapping an access card mapped to a first user account to a second user account corresponding to a transferee according to the execution condition for the transfer.

An instant message including information related to the transfer of the access card may be transmitted to at least one of the partner terminal, a user terminal of the first user account corresponding to a transferor, or a user terminal of the second user account corresponding to the transferee, and the instant message may be provided through a chatroom identified as a business entity of the partner terminal or the access card management server.

The processing of the access card may include mapping an access card mapped to a first user account to a second user account corresponding to a transferor or a user account of the partner terminal according to the execution condition for the return.

An instant message including information related to the return of the access card may be transmitted to at least one of the partner terminal, a user terminal of the first user account corresponding to a transferee, or a user terminal of the second user account corresponding to the transferor, and the instant message may be provided through a chatroom identified as a business entity of the partner terminal or the access card management server.

The processing of the access card may include mapping an access card mapped to a second user account corresponding to a transferee to a first user account corresponding to a transferor or a user account of the partner terminal according to the execution condition for the return.

An instant message including information related to retrieval of the access card may be transmitted to at least one of the partner terminal, a user terminal of the first user account corresponding to the transferor, or a user terminal of the second user account corresponding to the transferee, and the instant message may be provided through a chatroom identified as a business entity of the partner terminal or the access card management server.

Technical Benefits

According to an embodiment of the present disclosure, an access card required for a user to access online or offline may be more easily and conveniently managed through an application.

According to an embodiment of the present disclosure, a particular online or offline area related to a partner may be accessed through an access card required to access the area by managing access cards issued by a plurality of partners through an application.

According to an embodiment of the present disclosure, an access card generated by a partner may be transferred, returned, and retrieved, thereby improving usability of the access card.

BRIEF DESCRIPTION OF THE SEVERAL VIEWS OF THE DRAWINGS

FIG. 7 is a diagram illustrating a partner management page accessed by a partner terminal according to an embodiment of the present disclosure.

FIG. 9 is a diagram illustrating a card management page accessed by a partner terminal according to an embodiment of the present disclosure.

FIG. 11 is a diagram illustrating an example in which a user terminal issues an access card through an application according to an embodiment of the present disclosure.

DETAILED DESCRIPTION

Figure 1:
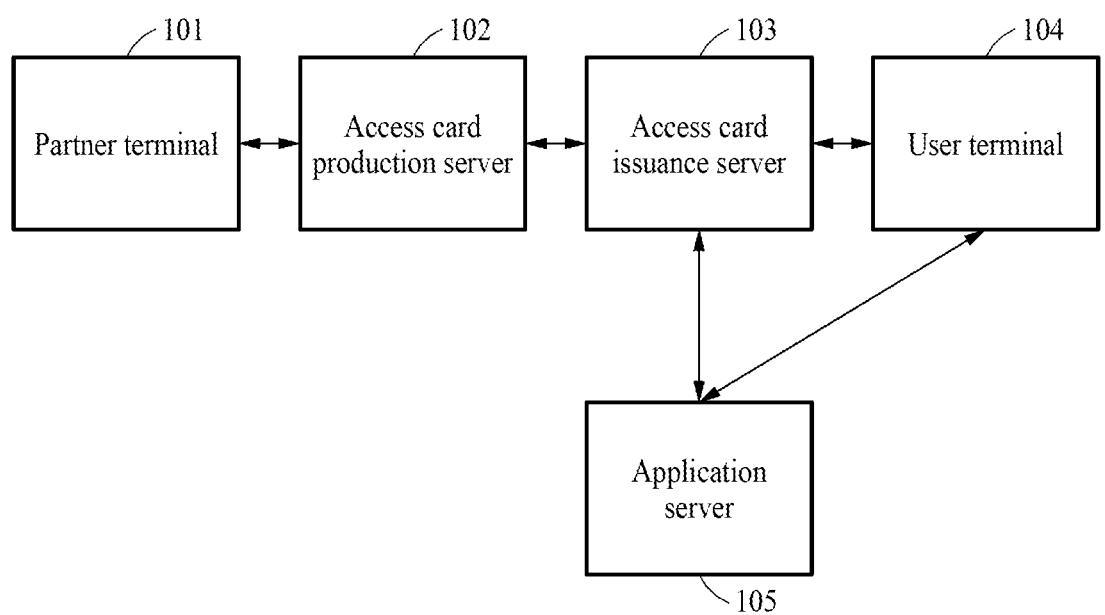
FIG. 1 is a diagram illustrating operations of apparatuses for performing a method of providing an access card according to a first embodiment of the present disclosure.

Hereinafter, embodiments will be described in detail with reference to the accompanying drawings. The scope of the right, however, should not be construed as limited to the embodiments set forth herein. In the drawings, like reference numerals are used for like elements.

Various modifications may be made to the embodiments. Here, the embodiments are not construed as limited to the disclosure and should be understood to include all changes, equivalents, and replacements within the idea and the technical scope of the disclosure.

Although terms of "first" or "second" are used to explain various components, the components are not limited to the terms. These terms should be used only to distinguish one component from another component. For example, a first component may be referred to as a second component, and similarly the second component may also be referred to as the first component.

The terminology used herein is for the purpose of describing particular embodiments only and is not to be limiting of the embodiments. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Hereinafter, embodiments will be described in detail with reference to the accompanying drawings.

FIG. 1 is a diagram illustrating operations of apparatuses for performing a method of providing an access card according to a first embodiment of the present disclosure.

FIG. 1 shows a partner terminal 101, an access card production server 102, an access card issuance server 103, a user terminal 104, and an application server 105. The partner terminal 101 may produce an access card through the access card production server 102 for online or offline access of a user holding the user terminal 104. The production of the access card may be performed through an access card production page provided by the access card production server 102.

The access card may be provided to the user terminal 104 that has accessed an access card issuance page provided by the access card issuance server 103. Alternatively, the access card may be provided through an application linked to the access card issuance server 103. In this case, the application may be installed on the user terminal 104 to operate in association with the application server 105, and provide a link or menu so that the user terminal 104 may access the access card issuance page.

According to an embodiment of the present disclosure, the partner terminal 101 may provide, to the user terminal 104, an access card which is a virtual card corresponding to a valid identity, qualification, company, school, membership, access card, warranty card, business card, ticket, and admission ticket, without the use of offline means for the user terminal 104.

In FIG. 1, the access card production server 102, the access card issuance server 103, and the application server 105 may be operated by the same business entity or by different business entities.

An access card may refer to a virtual card including information on qualifications to enter a particular online area (e.g., a website or application) related to a partner through login or to enter a particular offline space (e.g., a building) related to a partner. The access card may refer to a virtual card that allows the user terminal 104 to access or enter an online or offline area related to the partner.

In other words, the access card may be a digitized virtual card of an online or offline valid identity, qualification, company, school, membership, access card, warranty card, business card, ticket, or admission ticket. The partner terminal 101 may produce an access card which is a virtual card that digitizes and represents identity, rights, qualifications, ownership, or authority to enter, confirmed online or offline in a cloud type service.

The access cards may be divided into various types. For example, the access card may be a card used to prove identity or affiliation related to a partner, such as a student identification (ID) card, employee ID card, membership card, business card, or ID card. Alternatively, the access card may be an admission ticket to watch a performance, exhibition, or game related to the partner taking place at a particular time. The access card may be a membership, season ticket, or the like related to the partner that may be used in a particular period. Alternatively, the access card may refer to a card to enter a building designated by the partner, or may be information for authentication of purchase/possession of products or services related to the partner, such as a warranty. The access card described above refers to information that may prove whether the user has permission to access an online or offline area related to the partner, and is not limited to the examples described above.

For example, in order for the user to enter a chatroom generated by the partner, the user terminal 104 may receive an access card, which is permission to enter the chatroom through the card issuance page of the access card issuance server 103. In another example, in order for the user to visit a particular space (office) of the partner, the user terminal 104 may receive an access card, which is permission to enter the office through the card issuance page of the access card issuance server 103. The access card issued through the card issuance page of the access card issuance server 103 may be stored in at least one of the access card production server 102, the access card issuance server 103, the application server 105, or the user terminal 104.

The access card production server 102 may provide an access card production page, which is an interface through which the partner terminal 101, that wishes to produce an access card, may sign up, register, and then produce an access card. The access card issuance server 103 may provide an access card issuance page, which is an interface through which the user terminal 104, that wishes to receive an access card, may access and receive the access card. The user terminal 104 may access the access card issuance page through an application provided by the application server 105 and transmit a request for issuance of an access card. After the access card is issued, the user terminal 104 may manage the access card through the application. In an example, the application may be a messenger application.

As an access check device (not shown) connected to the partner terminal 101 checks whether the access card exists for the user terminal 104, the user may enter a particular offline space related to the partner. The user terminal 104 and the access check device may use a short-range wireless method (e.g., Bluetooth, near-field communication (NFC), etc.), the access check device may read identification information (e.g., a quick-response (QR) code) displayed on the user terminal 104, or the user terminal 104 may read identification information displayed on the access check device, to check whether the access card exists in the application installed on the user terminal 104.

According to an embodiment of the present disclosure, the access card required for various online or offline activities of the user is managed through the application installed on the user terminal 104, and accordingly, the access card may be conveniently accessed by the user terminal 104.

Figure 2:
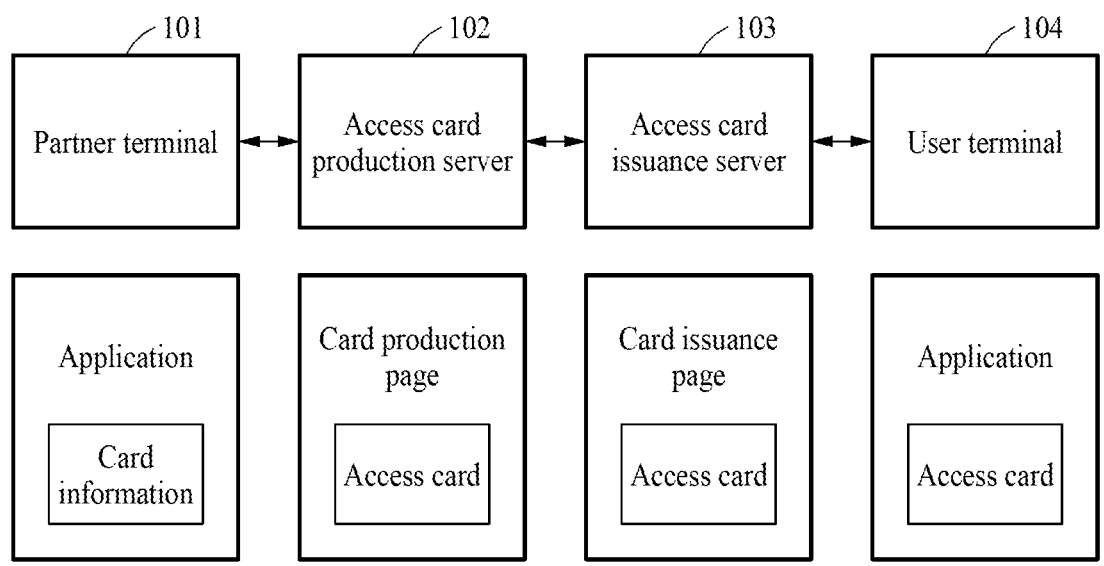
FIG. 2 is a diagram illustrating a process of providing an access card according to the first embodiment of the present disclosure.

FIG. 2 is a diagram illustrating a process of providing an access card according to the first embodiment of the present disclosure.

FIG. 2 shows a process in which an access card produced by the partner terminal 101 in the access card production server 102 is issued to the user terminal 104 that has accessed the access card issuance server 103.

The partner terminal 101 related to the partner may register the partner on the card production page provided by the access card production server 102, and produce an access card related to the partner. The card production page may provide an interface through which information on a partner is registered and the partner terminal 101 may input card information expressed as an image or a text to produce an access card.

The partner terminal 101 may use an application installed on the partner terminal 101 to access the card production page. The partner terminal 101 may produce an access card by inputting the card information for producing the access card to the card production page. The card information will be described in detail with reference to FIG. 8.

When the production of the access card is completed in the access card production server 102, an instant message including a notification that the production of the access card is completed or information on the access card produced based on the card information may be provided to the partner terminal 101 through a messenger application. In this case, the message may be provided through a chatroom in which a business entity corresponding to the partner terminal 101 participates or a chatroom in which a business entity corresponding to the access card production server 102 participates. A chatroom in which a business entity participates may be expressed by a business entity's name or icon.

The access card produced by the access card production server 102 may be provided to the user terminal 104 through the card issuance page provided by the access card issuance server 103. The card issuance page is accessible through a link (a Uniform Resource Locator (URL)) or a QR code. The link or the QR code for accessing the card issuance page may be provided to the user terminal 104 directly by the partner terminal 101, or may be provided to the user terminal 104 through the access card production server 102 or the access card issuance server 103.

The user terminal 104 may access the card issuance page through the link or the QR code for accessing the card issuance page, and receive the access card issued on the card issuance page through an application. A message notifying whether the access card is issued may be provided to the partner terminal 101 through an application.

When the issuance of the access card is completed by the access card issuance server 103, an instant message including a notification that the issuance of the access card is completed may be provided to the partner terminal 101 or the user terminal 104 through a messenger application. In this case, the message may be provided through a chatroom in which a business entity corresponding to the partner terminal 101 participates or a chatroom in which a business entity corresponding to the access card issuance server 103 participates. A chatroom in which a business entity participates may be expressed by a business entity's name or icon.

The access card may be generated in response to user information. The user information is information for identifying a user and may include a phone number of the user terminal 104 or account information (ID) of an application installed on the user terminal 104.

The access card may be stored in an application installed on the user terminal 104, or may be stored in the access card issuance server 103 rather than the user terminal 104, and the user terminal 104 may check it through the application.

The access card may be stored by various methods. In an example, when the access card is produced by the access card production server 102, the access card may be stored in a secure storage area of the access card production server 102 or the access card issuance server 103. In this case, the consent of the user terminal 104 may be required for the access card to be stored in the secure storage area of the access card production server 102 or the access card issuance server 103. In this case, the access card may not be stored in the user terminal 104, and a list of access cards issued to the partner may be provided through an application installed on the user terminal 104. After that, when a particular area of the partner is accessed online or offline through the user terminal 104, the user terminal 104 may download the access card from the secure storage area of the access card production server 102 or the access card issuance server 103 and store the access card. Alternatively, when a particular area of the partner is accessed online or offline through the user terminal 104, the access card may not be downloaded to the user terminal 104, and it may be confirmed whether the access card stored in the secure storage area of the access card production server 102 or the access card issuance server 103 exists through the user information corresponding to the access card.

In another example, when the access card is generated by the access card production server 102, the access card may be downloaded to the user terminal 104 and managed through an application. That is, the access card may be encrypted and stored in a storage area of the user terminal 104. When a particular area of the partner is accessed online or offline through the user terminal 104, it may be confirmed whether the access card exists by decrypting the encrypted access card through a certificate of the user terminal 104.

Figure 3:
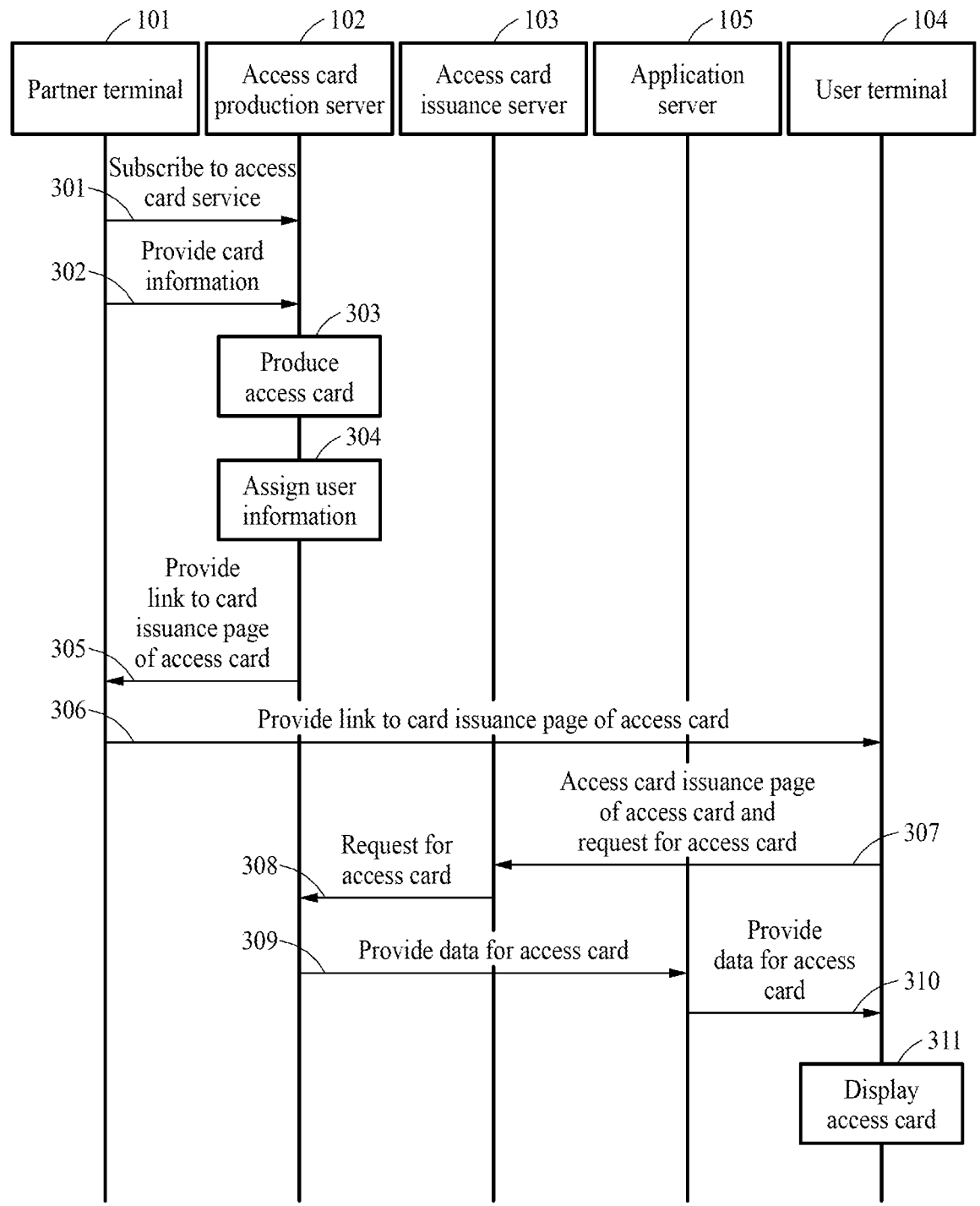
FIG. 3 is a flowchart illustrating a process of performing a method of providing an access card according to the first embodiment of the present disclosure.

FIG. 3 is a flowchart illustrating a process of performing a method of providing an access card according to the first embodiment of the present disclosure.

In operation 301, the partner terminal 101 may subscribe to an access card service through a partner management page provided by the access card production server 102. Information input when subscribing to the access card service will be described in detail with reference to FIG. 7.

In operation 302, the partner terminal 101 may provide card information to a card production page provided by the access card production server 102. The card information will be described in detail with reference to FIG. 8.

In operation 303, the access card production server 102 may produce an access card based on the card information input by the partner terminal 101. The card information transmitted to or registered in the access card production server 102 by the partner terminal 101 to produce an access card will be described in more detail with reference to FIG. 8.

In operation 304, the access card production server 102 may assign user information of the user terminal 104 to the access card. For example, when the access card is issued limitedly to a particular user terminal 104, the user information may be assigned to the access card. Although not shown in FIG. 3, when the user terminal 104 to which the access card is issued is not designated, the number of access cards that may be issued may be assigned to the access card on a first-come, first-served basis.

In operation 305, the access card production server 102 may provide a link to the card issuance page for the access card to the partner terminal 101.

In operation 306, the partner terminal 101 may provide a link to the card issuance page of the access card to the user terminal 104.

In operation 307, the user terminal 104 may access the card issuance page of the access card and request for the issuance of the access card to the access card issuance server 103.

In operation 308, the access card issuance server 103 may request for the access card to the access card production server 102.

In operation 309, the access card production server 102 may provide data for the access card to the application server 105. An actually produced access card may be stored in the access card production server 102, and the data for the access card required to display the access card may be provided to the application server 105.

In operation 310, the application server 105 may provide the data for the access card to the user terminal 104.

In operation 311, the user terminal 104 may display the access card through an application using the data for the access card.

Figure 4:
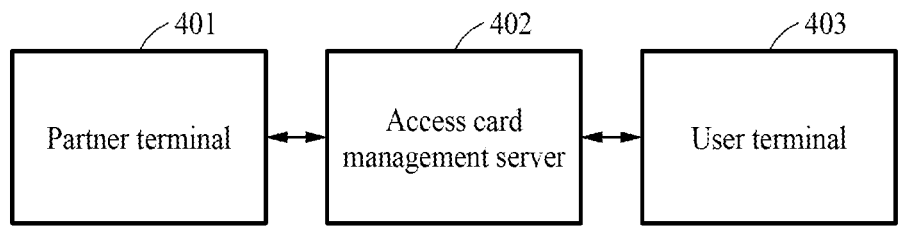
FIG. 4 is a diagram illustrating operations of apparatuses for performing a method of providing an access card according to a second embodiment of the present disclosure.

FIG. 4 is a diagram illustrating operations of apparatuses for performing a method of providing an access card according to a second embodiment of the present disclosure.

FIG. 4 shows a case where the access card production server 102, the access card issuance server 103, and the application server 105 described with reference to FIG. 1 are implemented through an access card management server 402, which is one server. The access card management server 402 may perform the same operations as those of the access card production server 102, the access card issuance server 103, and the application server 105. An operation of a partner terminal 401 may be the same as the operation of the partner terminal 101, and an operation of a user terminal 403 may be the same as the operation of the user terminal 104.

The partner terminal 401 may produce an access card through the access card management server 402 for online or offline access of a user holding the user terminal 403. The production of the access card may be performed through an access card production page provided by the access card management server 402. The access card may be provided to the user terminal 403 that has accessed an access card issuance page provided by the access card management server 402 through an application.

Figure 5:
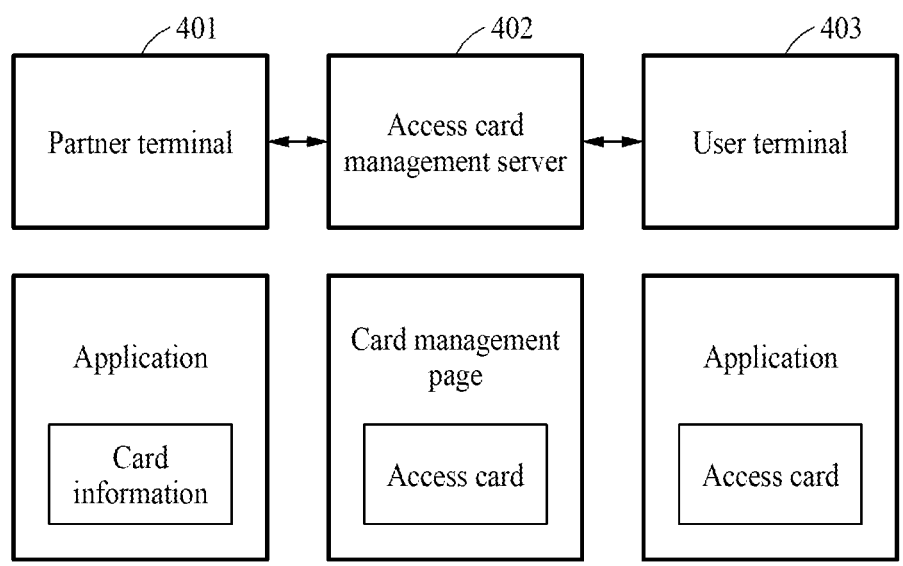
FIG. 5 is a diagram illustrating a process of providing an access card according to the second embodiment of the present disclosure.

FIG. 5 is a diagram illustrating a process of providing an access card according to the second embodiment of the present disclosure.

Specifically, FIG. 5 shows a process in which an access card produced by the partner terminal 401 in the access card management server 402 is issued to the user terminal 403 that has accessed the access card management server 402.

The partner terminal 401 related to a partner may register the partner on the card production page provided by the access card management server 402, and produce an access card related to the partner. The card production page may provide an interface through which information on a partner is registered and the partner terminal 401 may input card information expressed as an image or a text to produce an access card. The card information transmitted to or registered in the access card management server 402 by the partner terminal 401 to produce an access card will be described in more detail with reference to FIG. 8.

The partner terminal 401 may use an application installed on the partner terminal 401 to access the card production page. The partner terminal 401 may produce an access card by inputting the card information for producing the access card to the card production page.

When the production of the access card is completed in the access card management server 402, an instant message including a notification that the production of the access card is completed or information on the access card produced based on the card information may be provided to the partner terminal 401 through a messenger application. In this case, the message may be provided through a chatroom in which a business entity corresponding to the partner terminal 401 participates or a chatroom in which a business entity corresponding to the access card management server 402 participates. A chatroom in which a business entity participates may be expressed by a business entity's name or icon.

The access card produced by the access card management server 402 may be provided to the user terminal 403 through the card issuance page. The user terminal 403 may access the card issuance page through a link (URL) or a QR code. The link or the QR code for accessing the card issuance page may be provided to the user terminal 403 directly by the partner terminal 401, or may be provided to the user terminal 403 through the access card management server 402.

The user terminal 403 may access the card issuance page through the link or the QR code for accessing the card issuance page, and receive the access card issued on the card issuance page through an application. A message notifying whether the access card is issued may be provided to the partner terminal 401 through an application.

When the issuance of the access card is completed by the access card management server 402, an instant message including a notification that the issuance of the access card is completed may be provided to the partner terminal 401 or the user terminal 403 through a messenger application. In this case, the message may be provided through a chatroom in which a business entity corresponding to the partner terminal 401 participates or a chatroom in which a business entity corresponding to the access card management server 402 participates. A chatroom in which a business entity participates may be expressed by a business entity's name or icon.

When the access card is generated, user information may be assigned to the access card. The user information is information for identifying a user and may include a phone number of the user terminal 403, account information (ID) of an application installed on the user terminal 403, or identification information (employment number/student number, etc.) of another user.

The access card may be stored in an application installed on the user terminal 403, or may be stored in the access card management server 402 rather than the user terminal 403, and the user terminal 403 may check it through the application.

Figure 6:
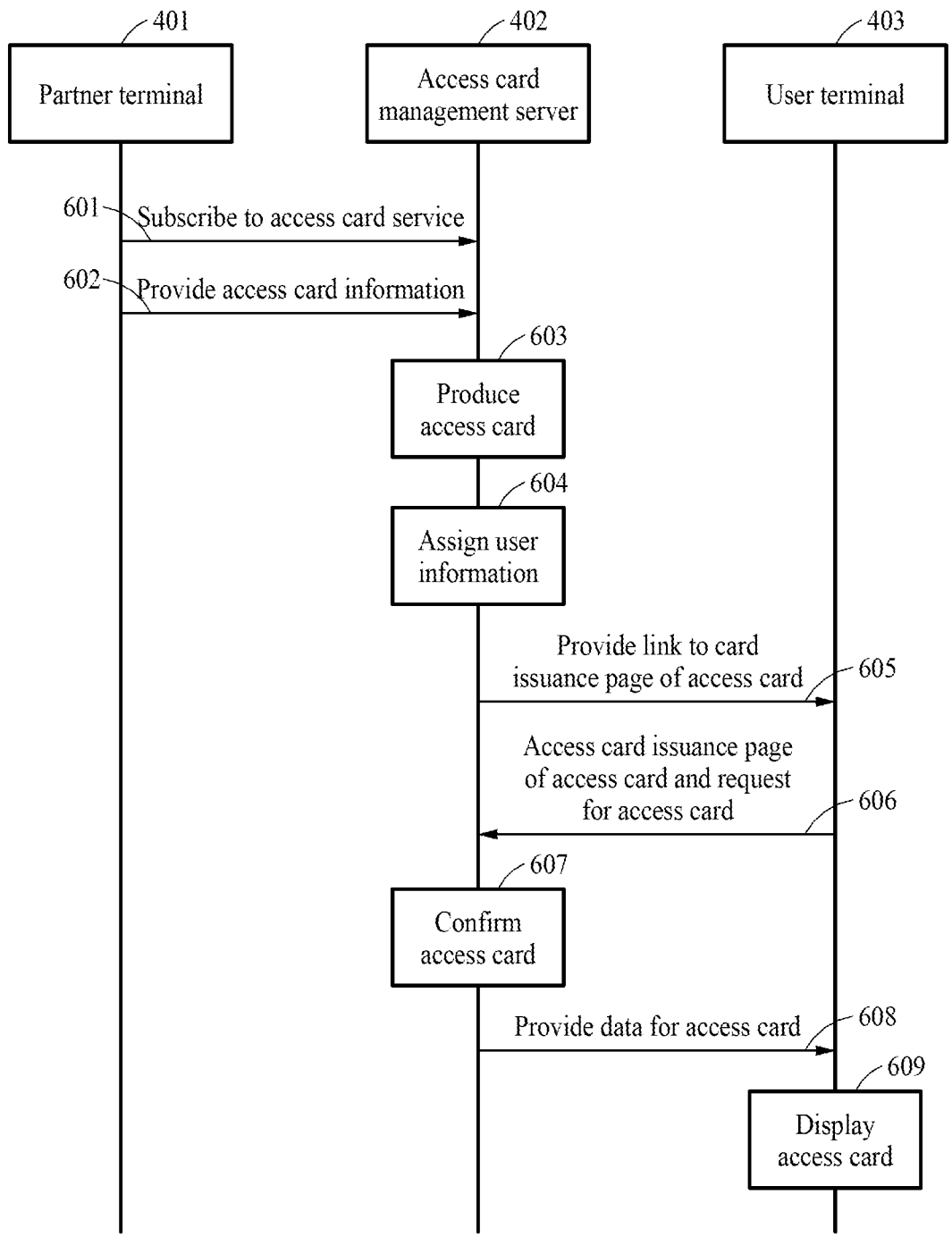
FIG. 6 is a flowchart illustrating a process of performing a method of providing an access card according to the second embodiment of the present disclosure.

FIG. 6 is a flowchart illustrating a process of performing a method of providing an access card according to the second embodiment of the present disclosure.

In operation 601, the partner terminal 401 may subscribe to an access card service through a partner management page provided by the access card management server 402. Information input when subscribing to the access card service will be described in detail with reference to FIG. 7.

In operation 602, the partner terminal 401 may provide card information to a card production page provided by the access card management server 402. The card information will be described in detail with reference to FIG. 8.

In operation 603, the access card management server 402 may produce an access card based on the card information input by the partner terminal 401.

In operation 604, the access card management server 402 may assign user information of the user terminal 403 to the access card. For example, when the access card is issued limitedly to a particular user terminal 403, the user information may be assigned to the access card. Although not shown in FIG. 6, when the user terminal 403 to which the access card is issued is not designated, the number of access cards that may be issued may be assigned to the access card on a first-come, first-served basis.

In operation 605, the access card management server 402 may provide a link to the card issuance page for the access card to the user terminal 403.

In operation 606, the user terminal 403 may access the card issuance page of the access card and request for the issuance of the access card to the access card management server 402.

In operation 607, the access card management server 402 may confirm the access card requested to be issued by the user terminal 403.

In operation 608, the access card management server 402 may provide data for the access card to the user terminal 403. An actually produced access card may be stored in the access card management server 402, and the data for the access card required to display the access card may be provided to the user terminal 403. Alternatively, the data for the access card may be stored in the user terminal 403.

In operation 609, the user terminal 403 may display the access card through an application using the data for the access card.

A partner management page and a card production page to be described with reference to FIGS. 7 to 14 may be provided by the access card production server 102 or the access card management server 402. Also, a card issuance page may be provided by the access card issuance server 103 or the access card management server 402. The partner terminal 101 and the user terminal 104 will be described with reference to FIGS. 7 to 14.

FIG. 7 is a diagram illustrating a partner management page accessed by a partner terminal according to an embodiment of the present disclosure.

The partner management page shown in FIG. 7 may refer to a page for the partner terminal 101 to sign up to produce an access card or to manage the access card after signing up.

The partner terminal 101 may register a name of a partner and administrator information to produce an access card. According to an embodiment of the present disclosure, the issuance of an access card may charge a fee. Account information for the partner may be set for the charging. The account information may include a recharge amount, price for the issuance of an access card, the number of access cards issued, current balance, and the like. The recharge amount refers to the amount the partner recharges to issue an access card. The price for the issuance of an access card may refer to the amount consumed each time one access card is issued. The price for the issuance of an access card may vary depending on the type of the access card and the number of access cards issued. The current balance may refer to the amount obtained by subtracting an amount obtained by multiplying the price for the issuance of an access card by the number of access cards issued, from the recharge amount.

An access card list refers to a list of access cards produced by the partner terminal 101. The access card list may provide a menu for viewing or editing classification of the access cards, a validity period, the number of productions, the number of issuances, and details of the access card.

Each item shown in FIG. 7 is merely an example, and items related to the access card may be further added.

Figure 8:
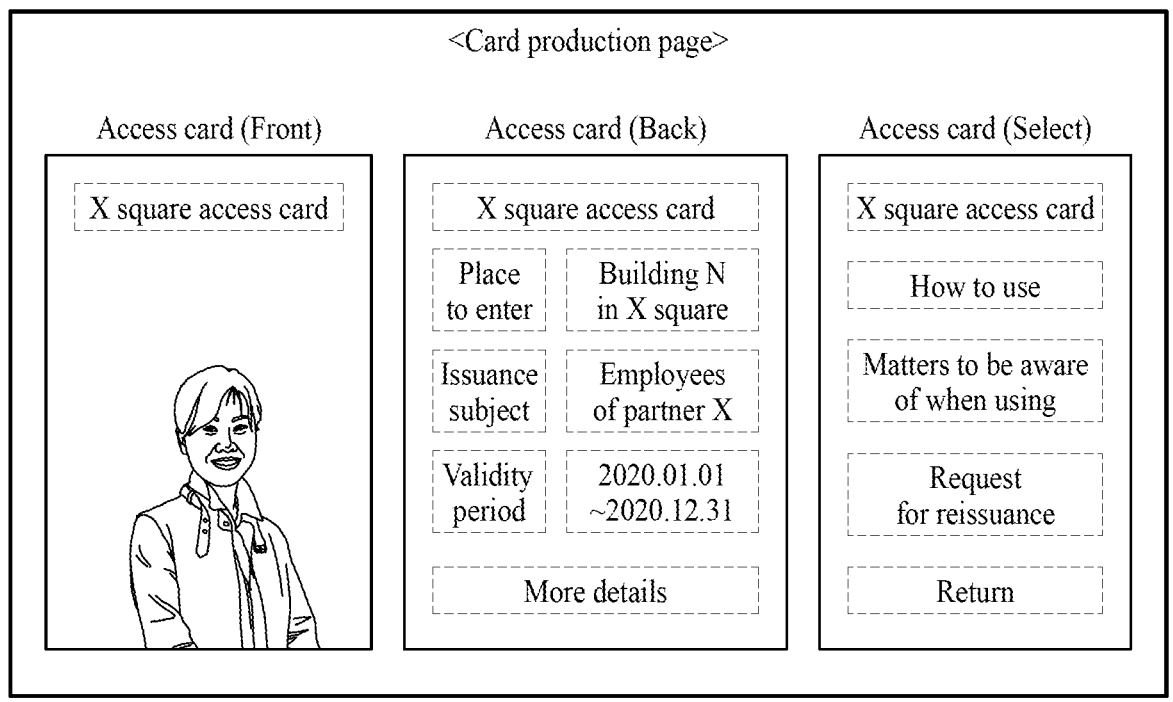
FIG. 8 is a diagram illustrating a card production page accessed by a partner terminal according to an embodiment of the present disclosure.

FIG. 8 is a diagram illustrating a card production page accessed by a partner terminal according to an embodiment of the present disclosure.

FIG. 8 shows a card production page provided by the access card production server 102 or the access card management server 402. Hereinafter, an operation between the partner terminal 101 and the access card production server 101 will be described, and the following descriptions may also be applied to an operation between the partner terminal 401 and the access card management server 402 in the same manner. The card production page of FIG. 8 is a page accessible by the partner terminal 101, and may be set for each access card that the partner terminal 101 wishes to produce. An interface for producing an access card is not limited to FIG. 8.

For example, card information input or registered by the partner terminal 101 to produce an access card may be produced based on at least one of pieces of information. The card information described below is an example, and the present disclosure is not limited thereto.

(1) Issuance subject information for an access card (e.g., a phone number of the user terminal 104, an application ID of the user terminal 104, personal identification information related to a user of the user terminal 104 (e.g., student number or employee number))

(2) Issuance number information for an access card (the issuance number information may be set when there is no issuance subject information for the user terminal 104)

(3) Application identification information of a business entity corresponding to the partner terminal 101 (e.g., identification information (ID) for an official account related to the business entity of the partner terminal 101 in a messenger application)

(4) Information on the partner terminal 101 which is an access terminal (5) Type of access card (e.g., a pass, student ID card, membership card, etc.), (6) Validity period information of an access card (7) Whether an access card is retrievable, transferable, or retransferable, and a condition on whether an access card is transferable or retransferable (e.g., including at least one of pre-processing requirements, time requirements, and regional requirements for enabling transfer or retransfer, or personnel requirements for transfer or retransfer)

(8) Store where an access card may be used (e.g., in a case of a chain store, an access card may be used only at a particular chain store) or local area where an access card may be used (9) Connection information on a third-party server connected to an access card (e.g., when borrowing a book with a student ID card which is an access card, to confirm a status of borrowed books of a user of the student ID card in association with a library server)

(10) Display information for an access card (e.g., including at least one of a name, image or color, hologram, logo, or text data registered by the partner terminal 101 for an access card)

The access card production page may provide an interface to edit the front and back of an access card as if it is a physical card. Information input to the card production page for the access card may be different depending on the type of the access card.

For example, information representing the user of the user terminal 104 (a name, photo, nickname, email address, affiliation, etc.) and a name of an access card may be displayed on the front of the access card. Detailed information that varies depending on the type of access card may be input to the back of the access card. When the access card is a pass, the back of an access card may include a place where a user enters with the access card, an issuance subject for an access card (a user of the user terminal 104), a validity period of the access card, and the like.

Also, detailed information on the access card may be additionally input. For example, a method of using the access card, matters to be aware of when using the access card, settings of a menu to request reissuance of the access card and a menu to request return of the access card, and the like may be additionally input by the partner terminal 101.

FIG. 9 is a diagram illustrating a card management page accessed by a partner terminal according to an embodiment of the present disclosure.

The card management page of FIG. 9 is a page accessible by the partner terminal 101, and may be set for each access card produced by the partner terminal 101.

The card management page is a page for providing information on the issuance of the access card to the partner terminal 101 after the access card is produced. The card management page may include an issuance period of the access card, an issuance link (a URL or a QR code), an issuance state of the access card, the number of issuance subjects of the access card, and issuance details of the access card.

When the issuance link is in the form of a URL, the partner terminal 101 may copy the issuance link and provide the copy to the user terminal 104 through an application. When the issuance link is a QR code, it may be provided to the partner terminal 101 so that the user terminal 104 may scan and recognize it.

When the partner terminal 101 produces N access cards, user information (e.g., a user account of an application or a phone number of the user terminal 104) may be assigned to the issuance details of the access card when the access card is issued. If the access card is not assigned to a particular user terminal and is issued on a first-come, first-served basis, the user information included in the issuance details may be assigned when the access card is substantially issued to the user terminal 104 after the access card is produced.

The state of the issuance and retrieval of the access card may be confirmed through the issuance details. The number of cases waiting for the issuance of an access card may refer to the number of cases excluding the number of issued cards from the number of issuance subjects.

FIG. 10 is a diagram illustrating an example in which a user terminal accesses a card issuance page according to an embodiment of the present disclosure.

Figure 10A:
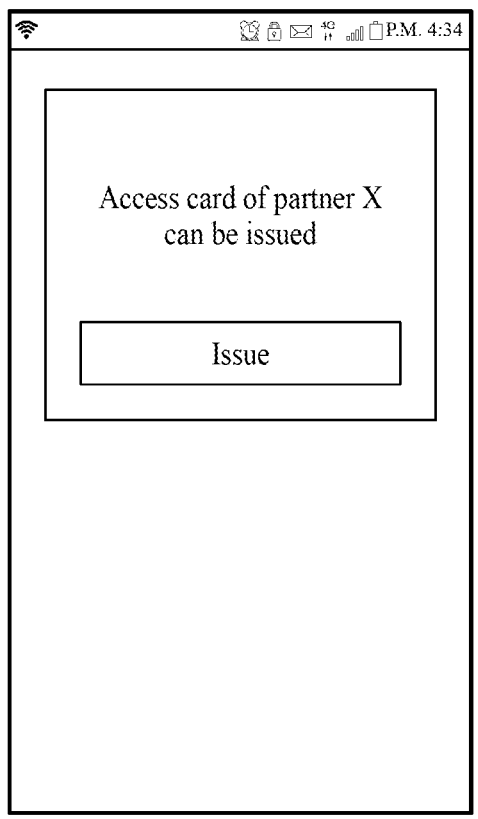
FIG. 10 is a diagram illustrating an example in which a user terminal accesses a card issuance page according to an embodiment of the present disclosure.

FIG. 10A shows a case where a link to a card issuance page of an access card, through which an access card may be issued, is transmitted through an application installed on the user terminal 104. For example, a link, through which an access card may be issued, may be provided to the user terminal 104 through a messenger application. In this case, the link may be provided through a chatroom in which a business entity corresponding to the partner terminal 101 participates or a chatroom in which a business entity corresponding to the access card production server 102 participates. A chatroom in which a business entity participates may be expressed by a business entity's name or icon.

Also, when the like for receiving the access card is provided to the user terminal 104 through a chatroom, the user terminal 104 for providing the link through the chatroom may be linked to the access card. For example, identification information (e.g., ID) of the application of the user terminal 104 and identification information (e.g., a phone number) for the user terminal 104 may be mapped to the access card.

When a menu called "Issue" is selected on the user terminal 104, the user terminal 104 may access the card issuance page through the link of the card issuance page connected to the corresponding menu and transmit a request to issue an access card.

Figure 10B:
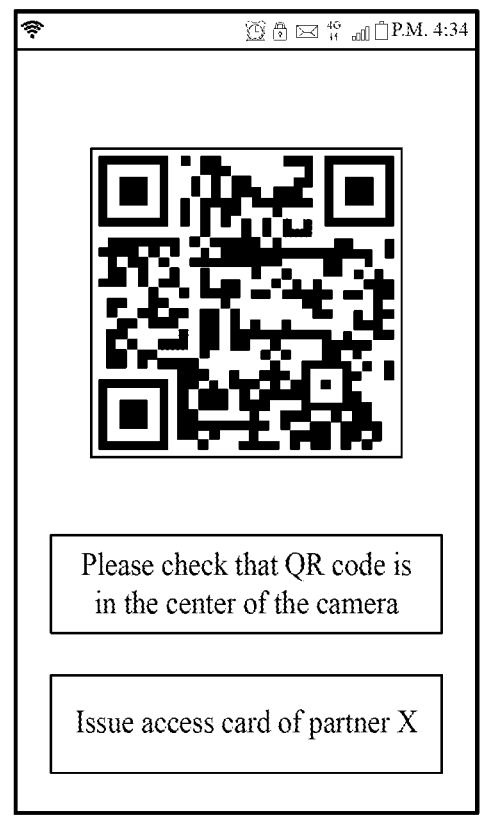

FIG. 10B shows a case of accessing the card issuance page of the user terminal 104 by recognizing a QR code displayed on the partner terminal 101 or displayed online (e.g., a web page)/offline (e.g., a kiosk, wall, or the like) through an application installed on the user terminal 104.

That is, referring to FIG. 10, the user terminal 104 may access the card issuance page provided by the access card issuance server 103 and request to issue an access card produced by the partner terminal 101 by selecting a URL or recognizing a QR code through the application.

FIG. 11 is a diagram illustrating an example in which a user terminal issues an access card through an application according to an embodiment of the present disclosure.

Referring to FIG. 11A, when the access card produced by the partner terminal 101 through the access card production server 102 is generated, the user terminal 104 may request to issue the access card through the application. Also, when the access card is issued, a notification message related to the card issuance may be provided through the application.

For example, when the application is a messenger application, a message containing a content that the access card is issued may be provided to the partner terminal 101 or the user terminal 104 in a chatroom related to the partner terminal 101 or the access card issuance server 103. In this case, the user terminal 104 may confirm the access card through the application. When data for the access card is provided to the user terminal 104 through the access card issuance server 104, the user terminal 104 may display the access card using the data for the access card through the application.

Referring to FIG. 11B, an interface in which access cards corresponding to the partner may be managed, for example, inquired, deleted, or edited may be provided in a particular function (e.g., an access card wallet) of the application installed on the user terminal 104. The user terminal 104 may receive a plurality of different types of access cards produced by different partner terminals 101 through the application. In addition, the user terminal 104 may manage the plurality of different types of access cards produced by the different partner terminals 101 through the interface shown in FIG. 11B. A list of access cards is provided through the application installed on the user terminal 104. Additional information may be assigned to each of the access cards.

For example, when an access card is generated in response to user information, additional information related to a condition for the access card to operate or for the access card to be valid may be additionally set. For example, the additional information may include time information, type information, profile information, verification information, and the like related to the access card.

The time information may refer to a start time point and an end time point for the access card to be valid. The type information may refer to information indicating whether the access card is a one-time or semi-permanent card through reissuance, information indicating whether the access card may be shared/transferred to others, or information on a method of using the access card. The profile information may be related to personal information of a user to whom the access card is issued, such as region, age, gender, affiliation, or the like. The verification information may be related to qualifications that are essential for the user to engage in online or offline activities, such as whether the user has been vaccinated, have a license, or has signed up for a membership.

FIG. 12 is a diagram illustrating an example in which a user terminal manages an access card through an application according to an embodiment of the present disclosure.

Figure 12A:
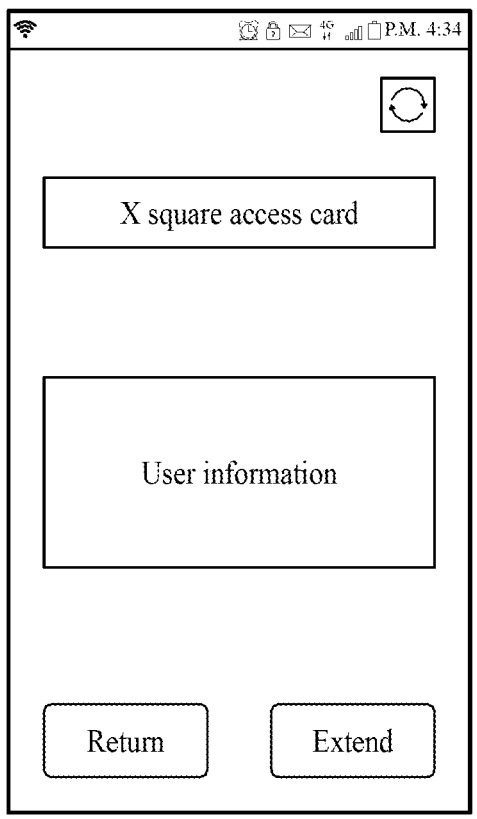
FIG. 12 is a diagram illustrating an example in which a user terminal manages an access card through an application according to an embodiment of the present disclosure.
Figure 12B:
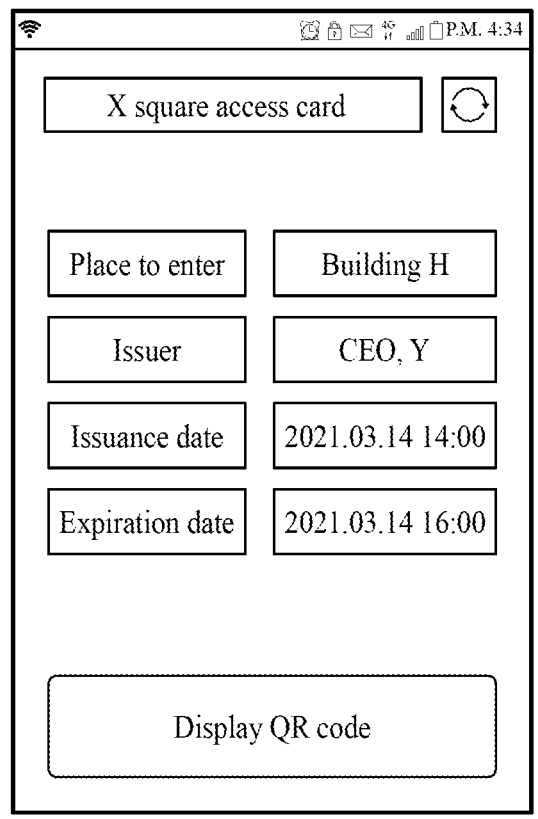

FIGS. 12A and 12B show results of the access card displayed through the application of the user terminal 104. FIG. 12A may show the front of the access card described above with reference to FIG. 8, and FIG. 12B may correspond to the back of the access card described above with reference to FIG. 8.

Referring to FIG. 12A, user information and partner information of a partner related to the issuance of the access card may be provided in the application of the user terminal 104. Also, a menu for returning and discarding the access card or extending the validity period, and the like may be provided through a display screen. The user information may refer to information for identifying a user holding the user terminal 104, such as a user's name, user's photo, user's affiliation, user's nickname, user's email address, etc.

Referring to FIG. 12B, pieces of information necessary for the use of the access card may be provided on the back of the access card. For example, as shown in a display screen shown in FIG. 12B, a validity period of the access card (an issuance date and an expiration date), a display menu of identification information corresponding to the access card (e.g., a QR code), specific information related to a partner that generated the access card (e.g., an issuer), location information where the access card may be used (e.g., a place to enter), and the like may be provided.

Figure 13:
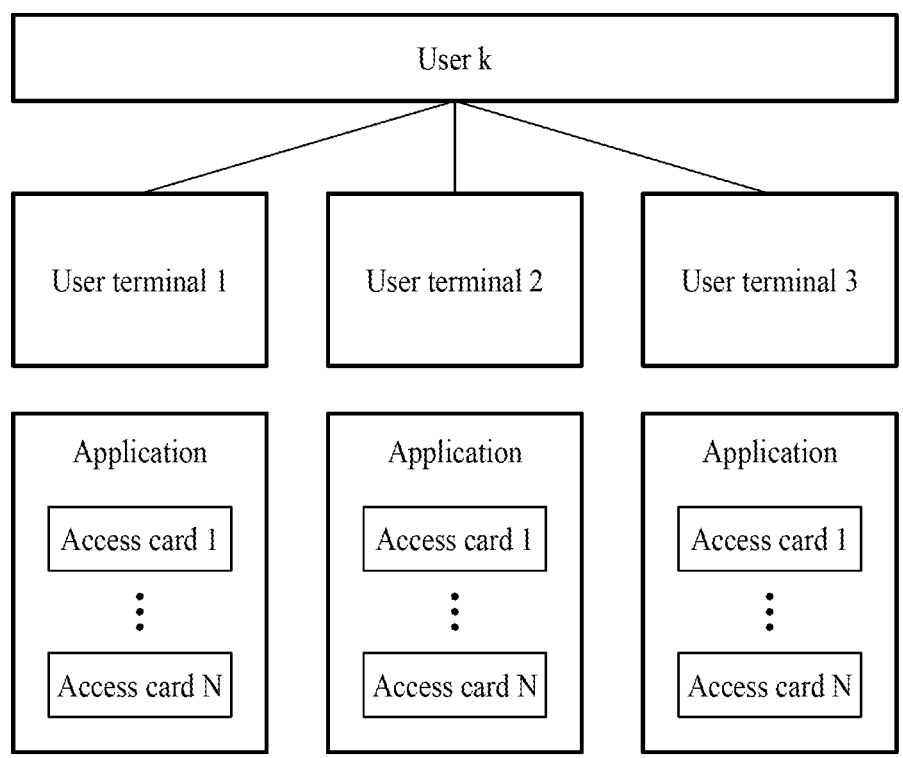
FIG. 13 is a diagram illustrating an example in which an access card is used through a plurality of user terminals according to an embodiment of the present disclosure.

FIG. 13 is a diagram illustrating an example in which an access card is used through a plurality of user terminals according to an embodiment of the present disclosure.

Referring to FIG. 13, a method of providing an access card when a user possesses a plurality of user terminals is provided. Here, the user terminals may have the same application installed. In addition, a list of access cards may be provided through the application installed on each user terminal.

For example, in each of the user terminals possessed by the same user (e.g., a user k), the same user information (e.g., user account) may be set through the application. Then, the list of access cards displayed through the application installed on each of the user terminals may also be provided in the same manner.

In another example, in each of the user terminals possessed by the same user (e.g., the user k), the same user information (e.g., user account) may be set through the application. However, the list of access cards displayed through the application installed on each of the user terminals may be provided differently for each user terminal.

For example, the list of access cards may be provided differently based on the types of the user terminals (e.g., whether it is a smartphone, a tablet personal computer (PC), or a wearable device), frequency of use of the user terminals, priority set for the user terminals, and attributes of the user terminals (a screen size, communication support method, etc.) set by a partner that generated the access cards.

Figure 14:
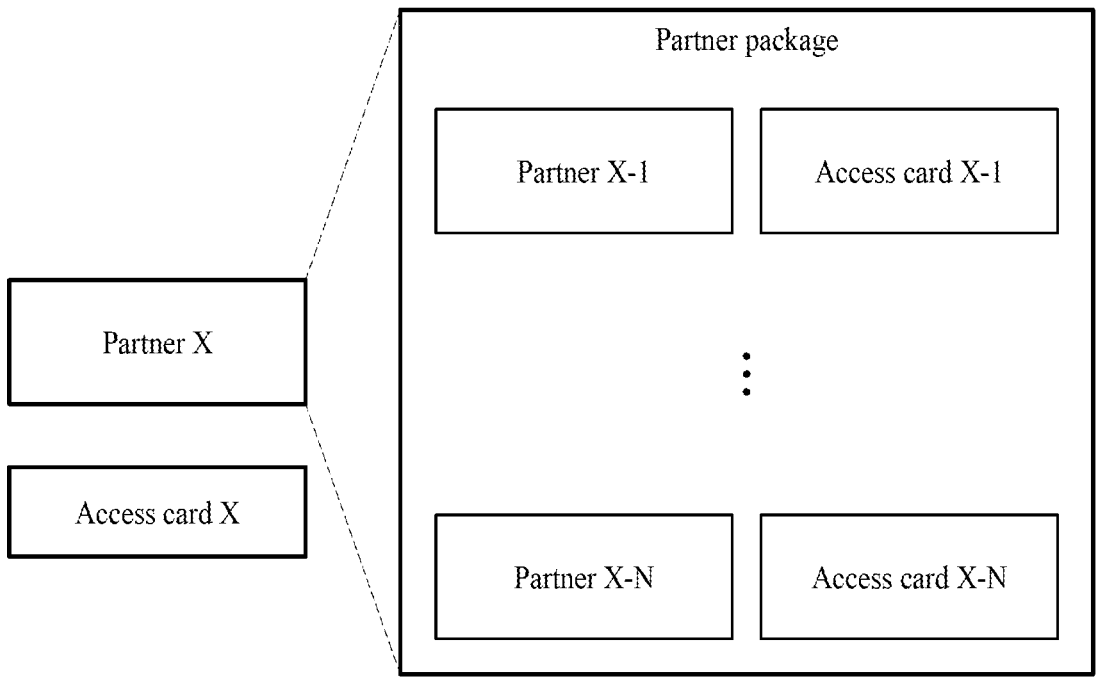
FIG. 14 is a diagram illustrating an example of generating an access card corresponding to a partner package according to an embodiment of the present disclosure.

FIG. 14 is a diagram illustrating an example of generating an access card corresponding to a partner package according to an embodiment of the present disclosure.

The partner terminal 101 that produces the access card may be associated with a partner X. At this time, when the partner X includes partners X-1 to X-N on a lower level, the partner terminal 101 may produce access cards in the unit of a package of the partners for the partner X.

For example, in a case where the partner X corresponds a particular university and the partners X-1 to X-N correspond to colleges located in the particular university, when producing an access card (e.g., a pass) of the partner X on the user terminal 104, the partner terminal 101 may also produce access cards of the partners X-1 to X-N belonging to the lower level of the partner X.

In this case, to the application installed on the user terminal 104, only information on the access card of the partner X on a higher level may be provided, or information on the access card of the partner X and the access cards of the partners X-1 to X-N belonging to the lower level of the partner X may be provided together.

In a case where the partners are structured hierarchically, when an access card of a partner on a higher level is produced, access cards of partners on a lower level may be automatically generated in the unit of a partner package. In this case, a hierarchical relationship for the partners may be input on the partner terminal 101. In addition, the access cards corresponding to the partners on the lower level may be produced independently of the access card corresponding to the partner on the higher level. For example, as shown in FIG. 8, in the card production page, information input when producing the access card corresponding to the partner on the higher level may be set differently from information input when producing the access cards corresponding to the partners on the lower level.

Figure 15:
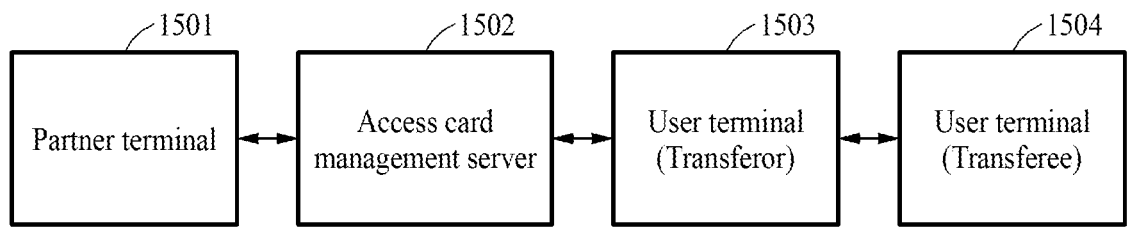
FIG. 15 is a diagram illustrating apparatuses for performing an access card processing method according to an embodiment of the present disclosure.

FIG. 15 is a diagram illustrating apparatuses for performing an access card processing method according to an embodiment of the present disclosure.

FIG. 15 shows a partner terminal 1501, an access card management server 1502, a user terminal 1503 corresponding to a transferor of an access card, and a user terminal 1504 corresponding to a transferee of an access card.

According to an embodiment of the present disclosure, an access card produced by the partner terminal 1501 may be issued to the user terminal 1503 according to a phone number or account information of a service application of the user terminal 1503. For example, the access card may refer to an ID card, certificate, employee ID card, student ID card, membership, access card, warranty card, digital business card, ticket, admission ticket, etc.

According to an embodiment of the present disclosure, the access card management server 1502 may produce the access card based on card information input by the partner terminal 1501. For example, the card information may include function settings for return, transfer, retrieval, or retransfer of the access card, and an execution condition for return, transfer, retrieval, or retransfer.

In addition, the access card management server 1502 may issue the access card produced by the partner terminal 1501 to the user terminal 1503. For the access card, the function settings for return, transfer, retrieval, or retransfer of the access card, and the execution condition for return, transfer, retrieval, or retransfer may be set.

In this case, the access card may be transferred from the user terminal 1503, the transferor of the access card, to the user terminal 1504, the transferee, in response to a request of the partner terminal 1501 or the user terminal 1503. The transfer of the access card may be performed when a transfer condition set by the partner terminal 1501 is satisfied, rather than in response to the request of the partner terminal 1501 or the user terminal 1503. In addition, as will be described with reference to FIG. 16, the access cards may be transferred (retransferred) sequentially in a serial form.

Meanwhile, the user terminal 1503 to which the access card is issued or the user terminal 1504 to which the access card is transferred from the user terminal 1503 may return the access card. The access card may be returned in response to a request of the user terminal that currently possesses the access card.

Alternatively, when there is a request for retrieval of the partner terminal 1501 or a retrieval condition set by the partner terminal 1501 is satisfied, the access card may be retrieved from the user terminal 1504 that currently possesses the transferred access card. Then, the access card possessed by the user terminal 1504, the transferee, may be possessed by the user terminal 1503, the transferor, again through the retrieval process.

In addition, according to an embodiment of the present disclosure, a processing process for transferring, returning, retrieving, or retransferring the access card may be shared with the partner terminal 1501 or the user terminal 1503 through a message. When the access card is transferred from the user terminal 1503 to the user terminal 1504, an instant message including information related to the transfer of the access card may be provided to the partner terminal 1501, the user terminal 1503 corresponding to the transferor, and the user terminal 1504 corresponding to the transferee, through a chatroom in which a business entity corresponding to the partner terminal 1501 participates or a chatroom in which a business entity corresponding to the access card management server 1502 participates. When the access card is retransferred, an instant message including information related to the retransfer may be provided to the partner terminal 1501 and user terminals corresponding to a re-transferor and a re-transferee.

When the access card is retrieved from the user terminal 1504 to the user terminal 1503 and transferred to the user terminal 1503, an instant message including information related to the retrieval of the access card may be provided to the partner terminal 1501, the user terminal 1503 corresponding to the transferor, and the user terminal 1504 corresponding to the transferee, through a chatroom in which a business entity corresponding to the partner terminal 1501 participates or a chatroom in which a business entity corresponding to the access card management server 1502 participates.

Figure 16:
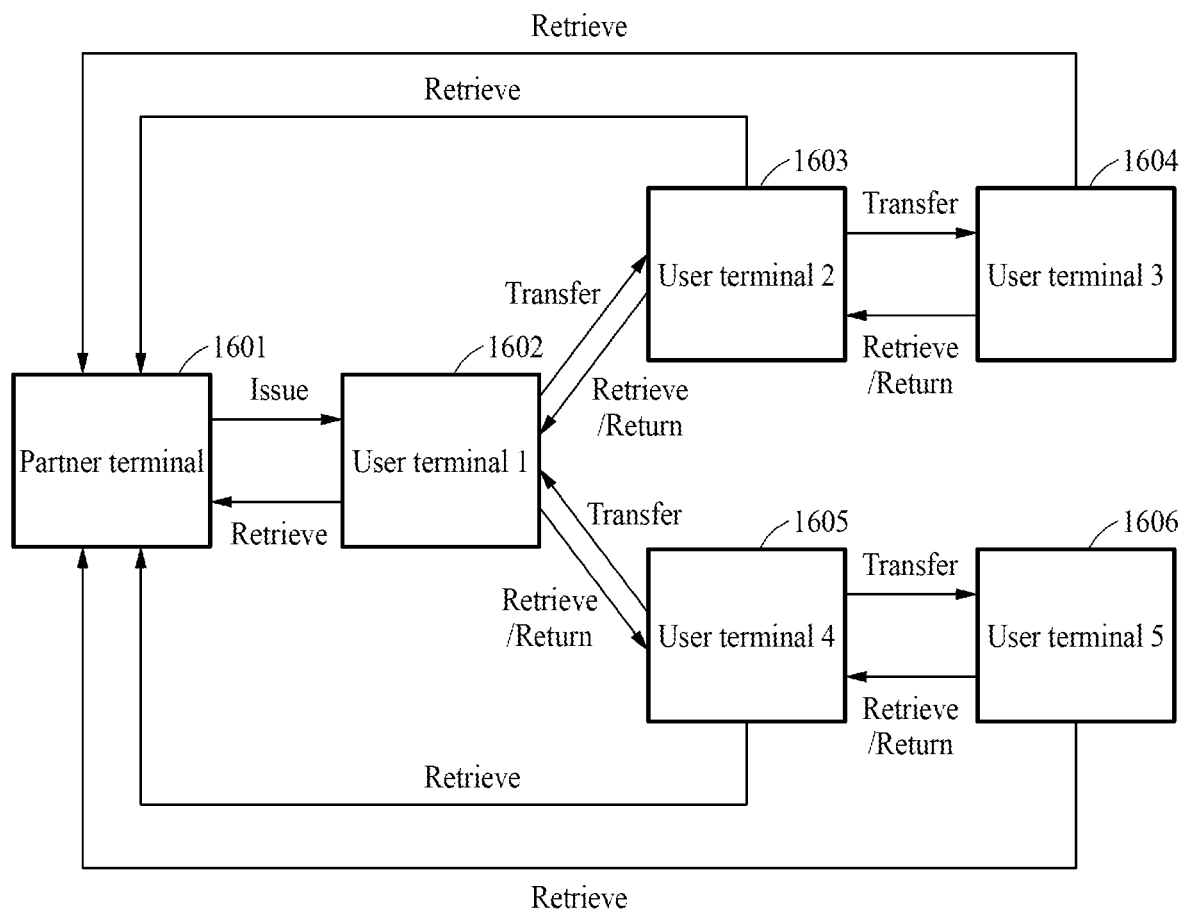
FIG. 16 is a diagram illustrating an access card processing method for transferring, retrieving, and returning of an access card according to an embodiment of the present disclosure.

FIG. 16 is a diagram illustrating an access card processing method for transferring, retrieving, and returning of an access card according to an embodiment of the present disclosure.

Referring to FIG. 16, a partner terminal 1601 may issue a digitized virtual access card to a user terminal 1 1602 through a cloud service. At this time, for the access card issued to the user terminal 1 1602, when there is a request of the partner terminal 1601 or the user terminal 1 1602, or a transfer condition set by the partner terminal 1601 or the user terminal 1 1602 is satisfied, the access card issued to the user terminal 1 1602 may be transferred to a user terminal 2 1603.

At this time, when the access card is transferred from the user terminal 1 1602 to the user terminal 2 1603, the access card may be maintained for the user terminal 1 1602 or retrieved. Meanwhile, the access card issued to the user terminal 1 1602 may be transferred to each of the user terminal 2 1603 and a user terminal 4 1605 by setting a transfer range. The authority or qualification set in the access card may be divided temporally or geographically, and thus, the access card issued to the user terminal 1 1602 may be transferred to each of the user terminal 2 1603 and the user terminal 4 1605. Specifically, when the access card is transferred to two user terminals separately in time, the access card may be transferred by dividing it into equal time intervals or different time intervals. In addition, the access card may be transferred to two user terminals separately by region. For example, when an offline area related to a business entity of the partner terminal 1601 is divided into an area A and an area B, and the access card is produced for an entire area of the offline area of the partner terminal 1501, access cards that allows to enter the area A and the area B, respectively, may be transferred to different user terminals.

For example, assuming that the access card issued to user terminal 1 1602 is related to the authority to enter the offline area of the partner terminal 1601, the access card transferred to the user terminal 2 1603 may be related to the authority to enter the offline area of the partner terminal 1601 in the morning, and the access card transferred to the user terminal 4 1605 may be related to the authority to enter the offline area of the partner terminal 1601 in the afternoon.

Alternatively, the access card issued to the user terminal 1 1602 may be transferred to the user terminal 2 1603 and the user terminal 4 1605 in a relationship of 1:N. That is, the access cards transferred to the user terminal 2 1603 and the user terminal 4 1605 may have the same content for the user terminal 2 1603 and the user terminal 1605. In this case, the access cards transferred to the user terminal 2 1603 and the user terminal 4 1605 may be used by the user terminal 2 1603 and the user terminal 4 1605 at the same time, or may have priority.

Meanwhile, when there is a request of the partner terminal 1601 or the user terminal 2 1603 or a transfer condition is satisfied, the access card transferred to the user terminal 2 1603 may be retransferred to the user terminal 3 1604.

In addition, a user terminal that currently possesses the access card may return the access card to the partner terminal 1601 or to a user terminal, to which the access card is just previously transferred, in response to a request of itself. In addition, when there is a request of the partner terminal 1601 or a retrieval condition is satisfied, the access card issued or transferred to a current user terminal may be retrieved to the partner terminal 1601 or a user terminal, to which the access card is just previously transferred.

Figure 17:
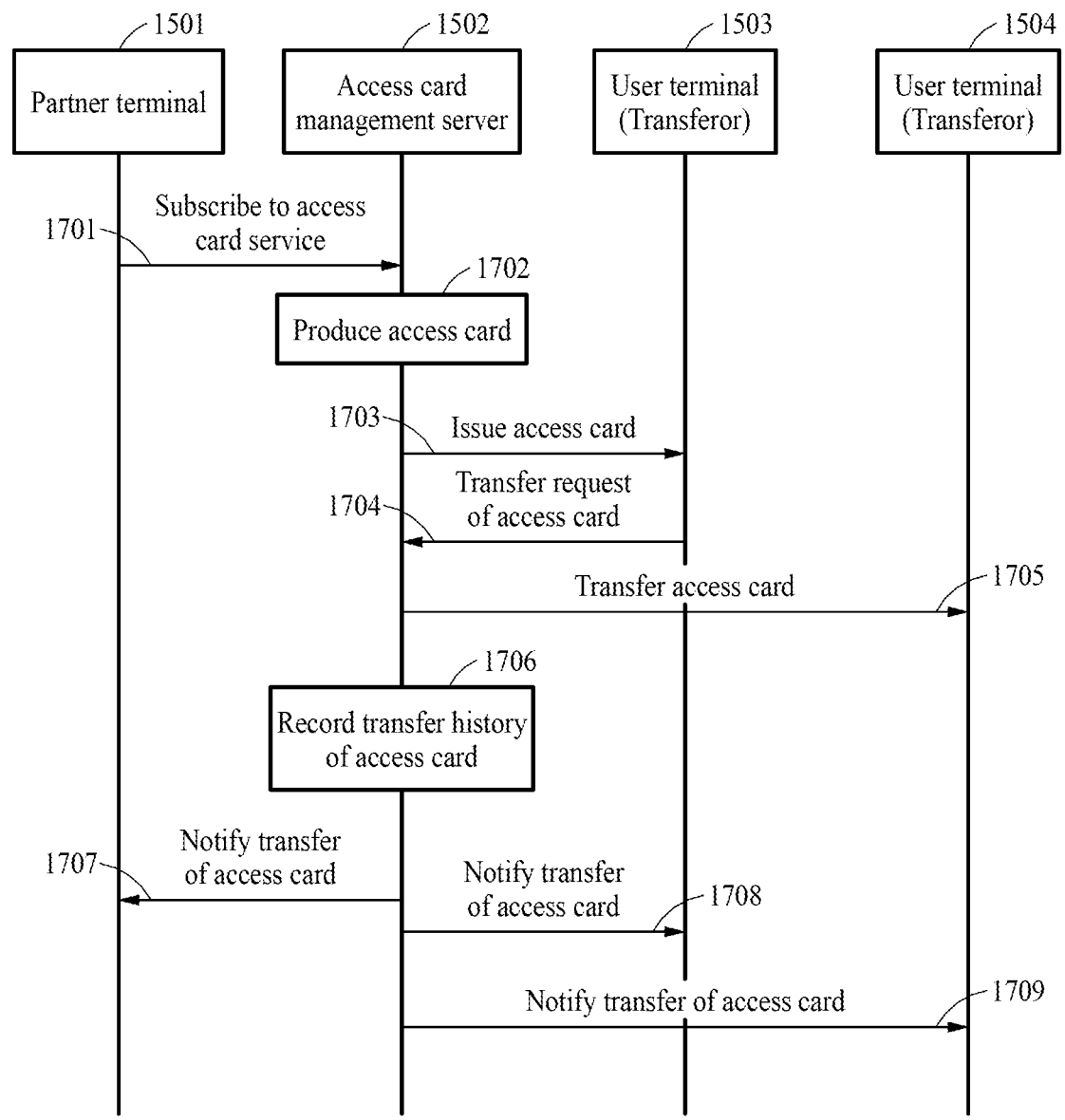
FIG. 17 is a flowchart illustrating an access card processing method in response to a transfer request for an access card of a user terminal according to an embodiment of the present disclosure.

FIG. 17 is a flowchart illustrating an access card processing method in response to a transfer request for an access card of a user terminal according to an embodiment of the present disclosure.

In operation 1701, the partner terminal 1501 may subscribe to an access card production service in the access card management server 1502.

In operation 1702, the access card management server 1502 may produce an access card based on card information on the access card input by the partner terminal 1501. The card information may include function settings for return, transfer, retrieval, or retransfer of the access card, and an execution condition for return, transfer, retrieval, or retransfer.

In operation 1703, the access card management server 1502 may issue an access card to the user terminal 1503.

In operation 1704, the user terminal 1503 may transmit a transfer request of the access card to the access card management server 1502.

In operation 1705, the access card management server 1502 may transfer the access card from the user terminal 1503, which is a transferor, to the user terminal 1504, which is a transferee. The user terminal 1504, which is the transferee, may be selected by the user terminal 1503 based on at least one of a list of friends in a messenger application or a list of phone numbers in a contact list of the user terminal 1503, which is the transferor.

In operation 1706, the access card management server 1502 may record a transfer history of the access card from the user terminal 1503, which is the transferor, to the user terminal 1504, which is the transferee.

In operation 1707, the access card management server 1502 may transmit, to the partner terminal 1501, a transfer notification that the access card is transferred from the user terminal 1503, which is the transferor, to the user terminal 1504, which is the transferee.

In operation 1708, the access card management server 1502 may transmit a transfer notification of the access card to the user terminal 1503, which is the transferor. Similarly, in operation 1709, the access card management server 1502 may transmit a transfer notification of the access card to the user terminal 1504, which is the transferee. The transfer notifications in operations 1707 to 1709 may be transmitted as messages through messenger applications installed on the partner terminal 1501, the user terminal 1503, and the user terminal 1504. When the access card is transferred from the user terminal 1503 to the user terminal 1504, an instant message including information related to the transfer of the access card may be provided to the partner terminal 1501, the user terminal 1503 corresponding to the transferor, and the user terminal 1504 corresponding to the transferee, through a chatroom in which a business entity corresponding to the partner terminal 1501 participates or a chatroom in which a business entity corresponding to the access card management server 1502 participates.

Figure 18:
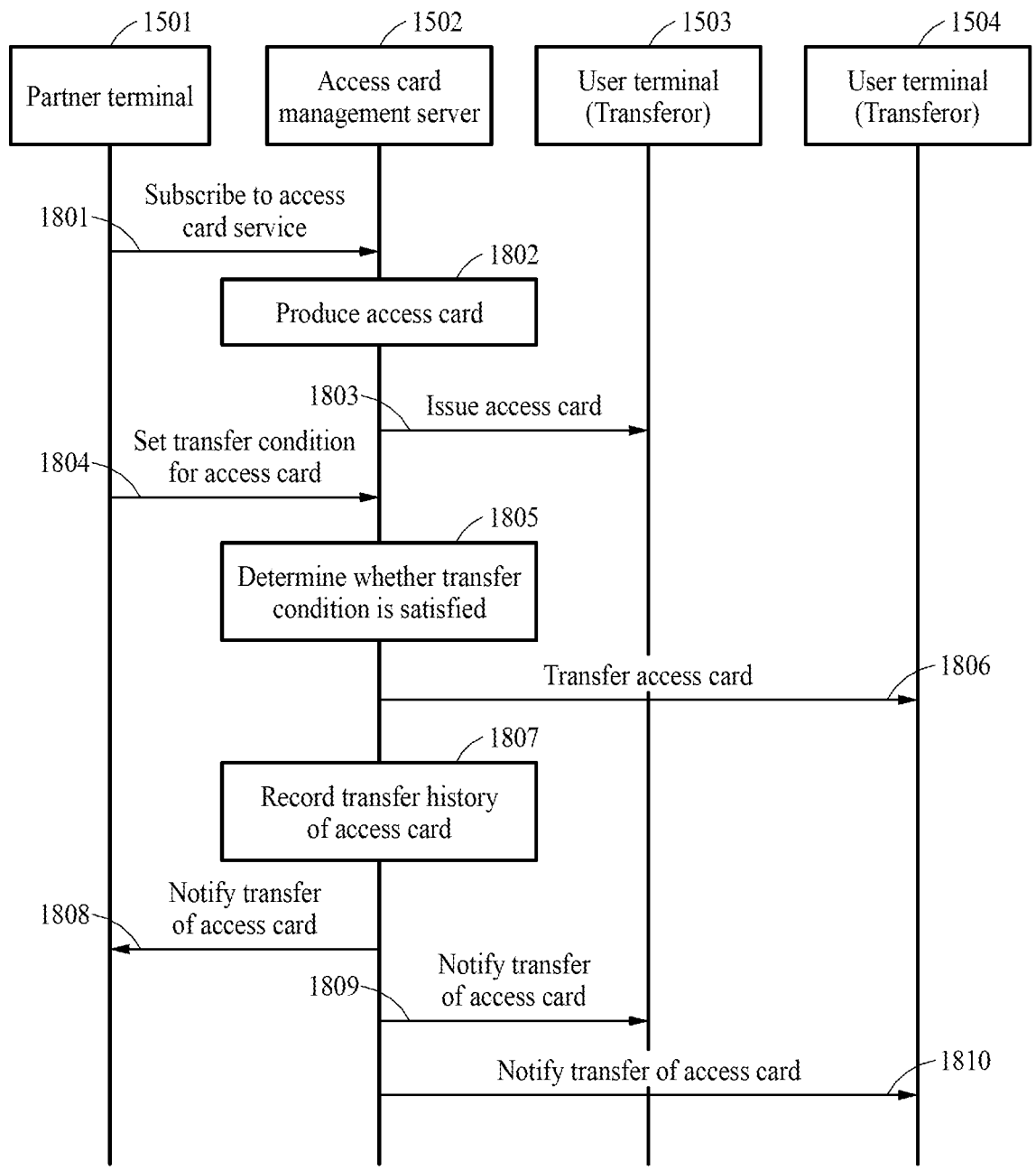
FIG. 18 is a flowchart illustrating an access card processing method based on a transfer condition of an access card according to an embodiment of the present disclosure.

FIG. 18 is a flowchart illustrating an access card processing method based on a transfer condition of an access card according to an embodiment of the present disclosure.

In operation 1801, the partner terminal 1501 may subscribe to an access card production service in the access card management server 1502.

In operation 1802, the access card management server 1502 may produce an access card based on card information on the access card input by the partner terminal 1501. The card information may include function settings for return, transfer, retrieval, or retransfer of the access card, and an execution condition for return, transfer, retrieval, or retransfer.

In operation 1803, the access card management server 1502 may issue an access card to the user terminal 1503.

In operation 1804, the partner terminal 1501 may transmit a transfer condition for the access card to the access card management server 1502.

In operation 1805, the access card management server 1502 may determine whether the transfer condition for the access card set by the partner terminal 1501 is satisfied.

In operation 1806, when the transfer condition for the access card is satisfied, the access card management server 1502 may transfer the access card issued to the user terminal 1503 from the user terminal 1503, which is the transferor, to the user terminal 1504, which is the transferee. The user terminal 1504, which is the transferee, may be selected by the user terminal 1503 based on at least one of a list of friends in a messenger application or a list of phone numbers in a contact list of the user terminal 1503, which is the transferor.

In operation 1807, the access card management server 1502 may record a transfer history of the access card from the user terminal 1503, which is the transferor, to the user terminal 1504, which is the transferee.

In operation 1808, the access card management server 1502 may transmit, to the partner terminal 1501, a transfer notification that the access card is transferred from the user terminal 1503, which is the transferor, to the user terminal 1504, which is the transferee.

In operation 1809, the access card management server 1502 may transmit the transfer notification of the access card to the user terminal 1503, which is the transferor. Similarly, in operation 1810, the access card management server 1502 may transmit the transfer notification of the access card to the user terminal 1504, which is the transferee. The transfer notifications in operations 1808 to 1810 may be transmitted as messages through messenger applications installed on the partner terminal 1501, the user terminal 1503, and the user terminal 1504. When the access card is transferred from the user terminal 1503 to the user terminal 1504, an instant message including information related to the transfer of the access card may be provided to the partner terminal 1501, the user terminal 1503 corresponding to the transferor, and the user terminal 1504 corresponding to the transferee, through a chatroom in which a business entity corresponding to the partner terminal 1501 participates or a chatroom in which a business entity corresponding to the access card management server 1502 participates.

Figure 19:
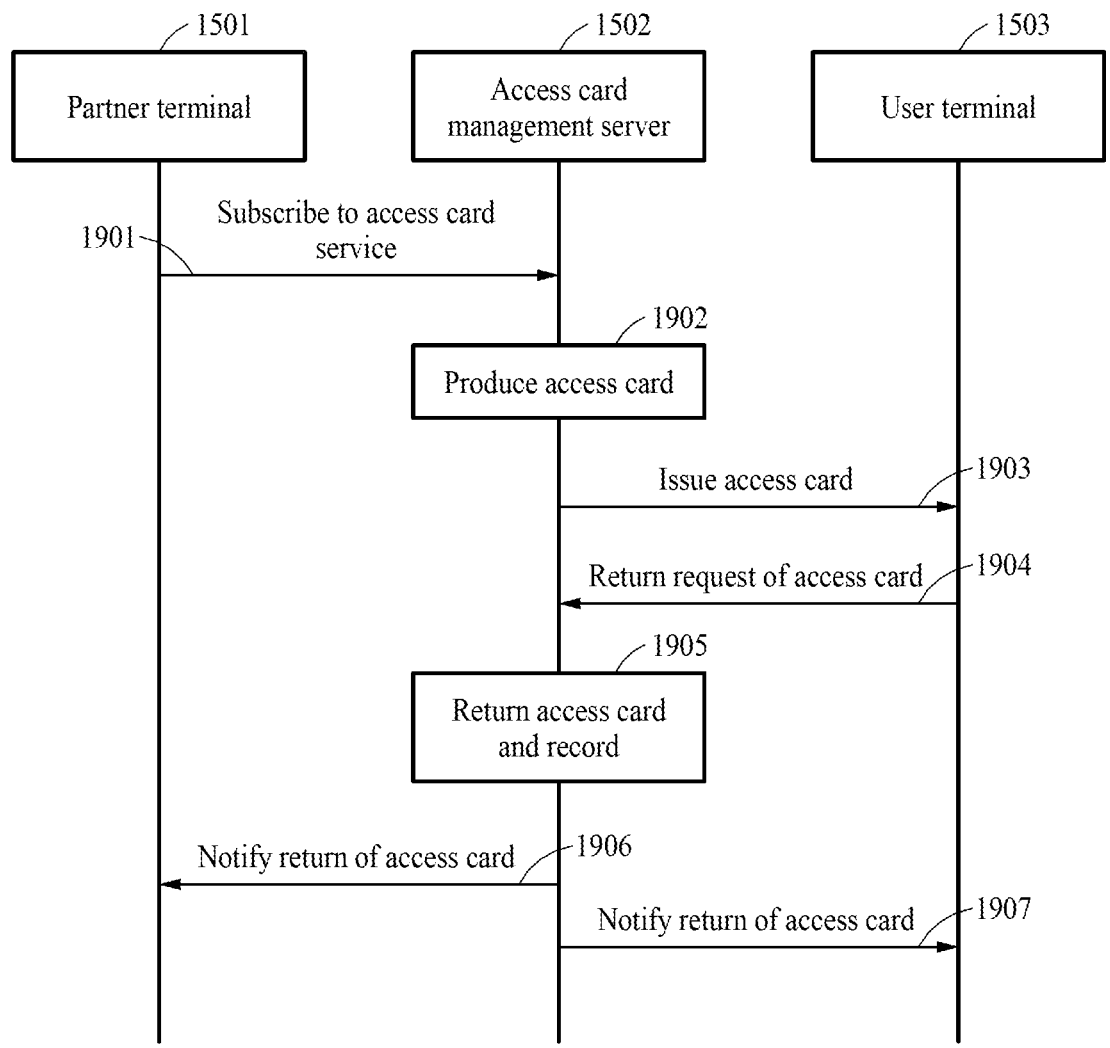
FIG. 19 is a diagram illustrating an access card processing method in response to a return request of an access card according to an embodiment of the present disclosure.

FIG. 19 is a diagram illustrating an access card processing method in response to a return request of an access card according to an embodiment of the present disclosure.

In operation 1901, the partner terminal 1501 may subscribe to an access card production service in the access card management server 1502.

In operation 1902, the access card management server 1502 may produce an access card based on card information on the access card input by the partner terminal 1501. The card information may include function settings for return, transfer, retrieval, or retransfer of the access card, and an execution condition for return, transfer, retrieval, or retransfer.

In operation 1903, the access card management server 1502 may issue an access card to the user terminal 1503.

In operation 1904, the user terminal 1503 may transmit a return request of the access card to the access card management server 1502.

In operation 1905, the access card management server 1502 may return the access card issued to the user terminal 1503 and record a result of the return process.

In operation 1906, the access card management server 1502 may transmit a return notification of the access card to the user terminal 1501.

In operation 1907, the access card management server 1502 may transmit a return notification of the access card to the user terminal 1503.

The return notifications in operations 1906 and 1907 may be transmitted as messages through messenger applications installed on the partner terminal 1501 and the user terminal 1503. When the access card is returned from the user terminal 1504 to the user terminal 1503, an instant message including information related to the return of the access card may be provided to the partner terminal 1501, the user terminal 1503 corresponding to the transferor, and the user terminal 1504 corresponding to the transferee, through a chatroom in which a business entity corresponding to the partner terminal 1501 participates or a chatroom in which a business entity corresponding to the access card management server 1502 participates.

Figure 20:
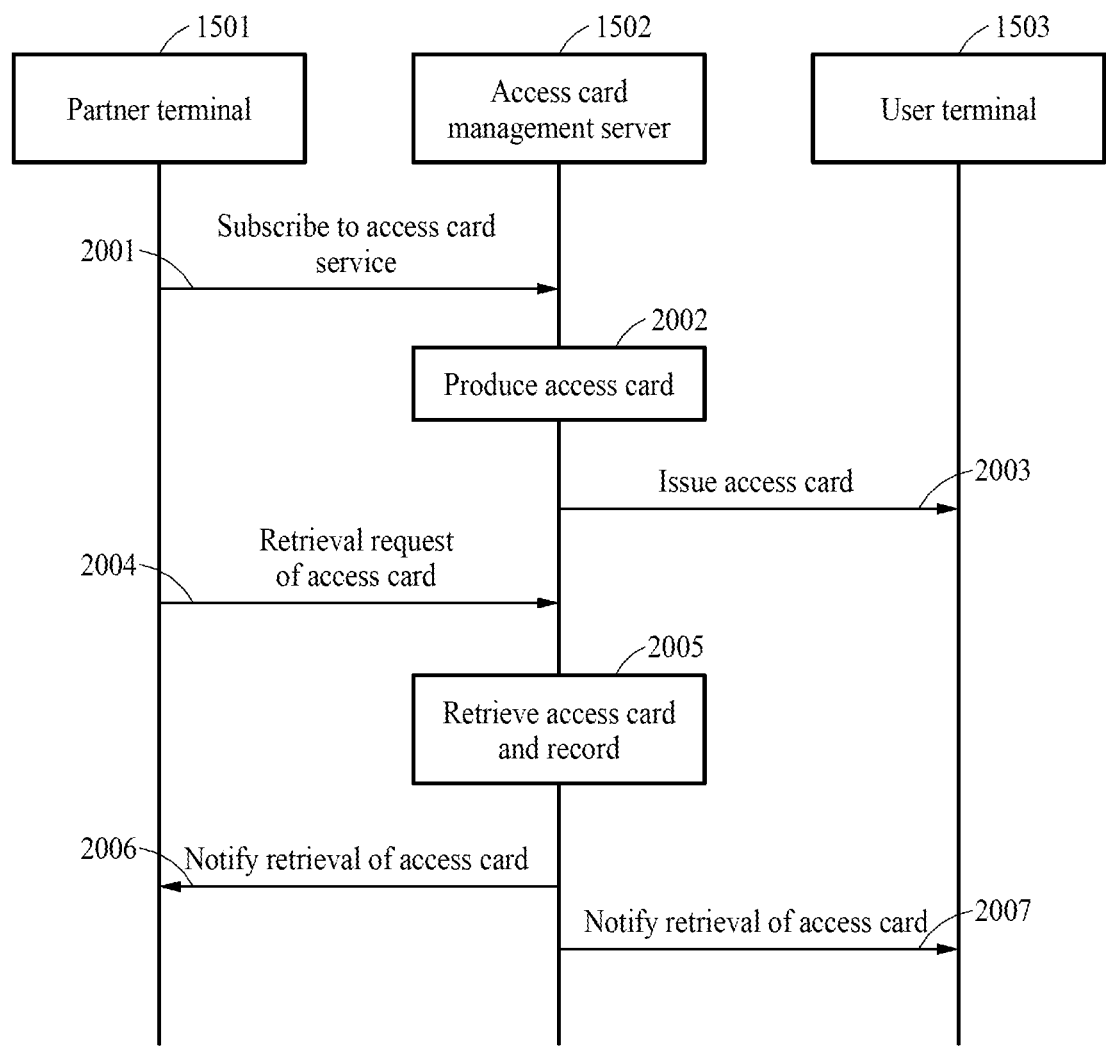
FIG. 20 is a diagram illustrating an access card processing method in response to a retrieving request of an access card according to an embodiment of the present disclosure.

FIG. 20 is a diagram illustrating an access card processing method in response to a retrieving request of an access card according to an embodiment of the present disclosure.

In operation 2001, the partner terminal 1501 may subscribe to an access card production service in the access card management server 1502.

In operation 2002, the access card management server 1502 may produce an access card based on card information on the access card input by the partner terminal 1501. The card information may include function settings for return, transfer, retrieval, or retransfer of the access card, and an execution condition for return, transfer, retrieval, or retransfer.

In operation 2003, the access card management server 1502 may issue an access card to the user terminal 1503.

In operation 2004, the partner terminal 1501 may transmit a retrieval request of the access card to the access card management server 1502.

In operation 2005, the access card management server 1502 may retrieve the access card issued to the user terminal 1503 and record a result of the retrieval process.

In operation 2006, the access card management server 1502 may transmit a retrieval notification of the access card to the partner terminal 1501.

In operation 2007, the access card management server 1503 may transmit a retrieval notification of the access card to the user terminal 1503.

The retrieval notifications in operations 2006 and 2007 may be transmitted as messages through messenger applications installed on the partner terminal 1501 and the user terminal 1503. When the access card is retrieved from the user terminal 1503, an instant message including information related to the retrieval of the access card may be provided to the partner terminal 1501 and the user terminal 1503 through a chatroom in which a business entity corresponding to the partner terminal 1501 participates or a chatroom in which a business entity corresponding to the access card management server 1502 participates.

Figure 21:
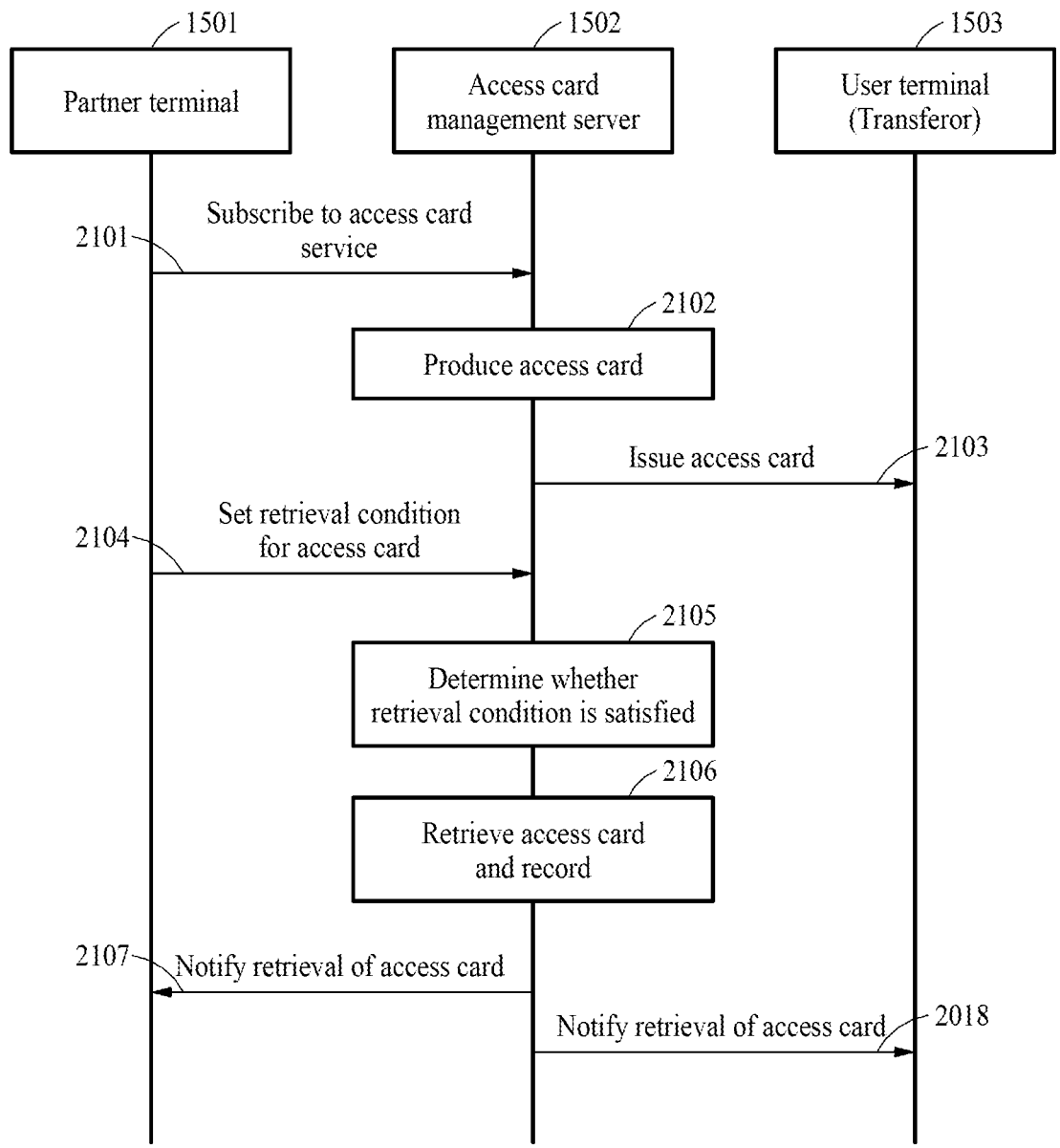
FIG. 21 is a flowchart illustrating an access card processing method based on a retrieving condition of an access card according to an embodiment of the present disclosure.

FIG. 21 is a flowchart illustrating an access card processing method based on a retrieving condition of an access card according to an embodiment of the present disclosure.

In operation 2101, the partner terminal 1501 may subscribe to an access card production service in the access card management server 1502.

In operation 2102, the access card management server 1502 may produce an access card based on card information on the access card input by the partner terminal 1501. The card information may include function settings for return, transfer, retrieval, or retransfer of the access card, and an execution condition for return, transfer, retrieval, or retransfer.

In operation 2103, the access card management server 1502 may issue an access card to the user terminal 1503.

In operation 2104, the partner terminal 1501 may transmit a retrieval condition for the access card to the access card management server 1502.

In operation 2105, the access card management server 1502 may determine whether the retrieval condition for the access card set by the partner terminal 1501 is satisfied.

In operation 2106, the access card management server 1502 may retrieve the access card issued to the user terminal 1503 and record a result of the retrieval process.

In operation 2107, the access card management server 1502 may transmit a retrieval notification of the access card to the partner terminal 1501.

In operation 2108, the access card management server 1502 may transmit a retrieval notification of the access card to the user terminal 1503.

The retrieval notifications in operations 2107 and 2108 may be transmitted as messages through messenger applications installed on the partner terminal 1501 and the user terminal 1503. When the access card is retrieved from the user terminal 1503, an instant message including information related to the retrieval of the access card may be provided to the partner terminal 1501 and the user terminal 1503, through a chatroom in which a business entity corresponding to the partner terminal 1501 participates or a chatroom in which a business entity corresponding to the access card management server 1502 participates.

FIG. 22 is a diagram illustrating an interface for processing an access card according to an embodiment of the present disclosure.

Figures 22A, 22B:
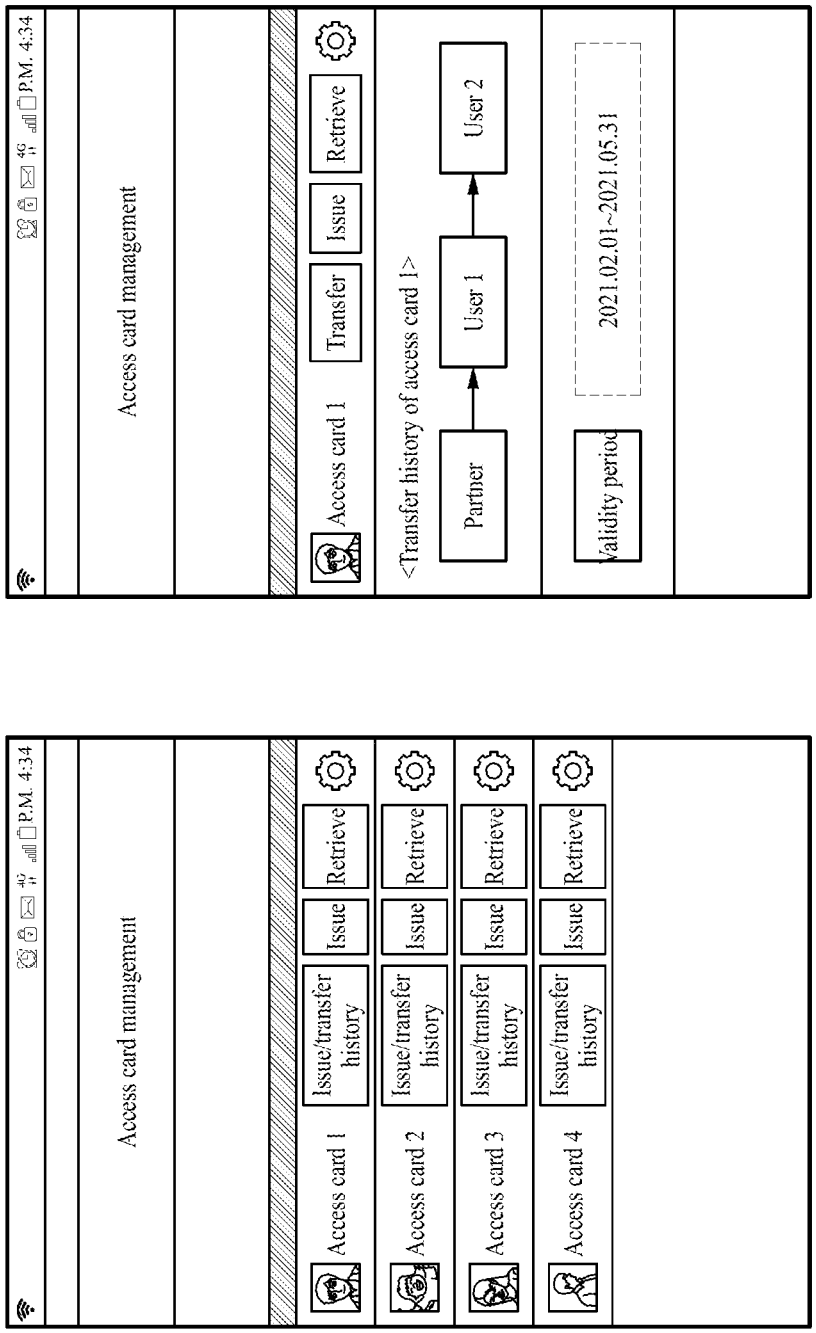
FIG. 22 is a diagram illustrating an interface for processing an access card according to an embodiment of the present disclosure.

FIG. 22A shows an example of an access card management interface provided to the partner terminal 1501. FIG. 22B shows an example of an access card management interface provided to the user terminal 1504, which is the transferee of the access card.

Referring to FIG. 22A, the partner terminal 1501 may manage an access card produced using card information through the interface. At this time, the interface may provide a menu to check information on an issuance history and a transfer history for each access card. The issuance history may include information on the user terminal 1504, to which the access card produced by the partner terminal 1501 is issued, and information related to an issuance time point. The transfer history may include information on a transferee when the access card issued to the user terminal 1504 is transferred or retransferred, and information related to a transfer time point.

The partner terminal 1501 may issue an access card to the user terminal 1504 by selecting a menu "Issue." The number of access cards that may be issued may be set by the partner terminal 1501. In addition, the partner terminal 1501 may retrieve the access card from the user terminal 1501 which is currently issuing the access card or currently possesses the access card through transfer by selecting a menu "Retrieve."

Referring to FIG. 22B, the user terminal 1504 may transfer, retransfer, retrieve, or return the access card. The user terminal 1504 may transfer a currently issued or transferred access card to another user terminal by selecting a menu "Transfer." A transfer request of the user terminal 1504 may be performed when it is set to the access card by the partner terminal 1501. In a case where the partner terminal 1501 produces the access card, when the access card is set to be not transferable (e.g., OFF of a transfer function or OFF of a retransfer function is selected), the user terminal 1504 may not perform the transfer request for the access card.

When the menu "Transfer" is selected, a list of user terminals 1504 registered as friends in a messenger application or a list of user terminals 1504 with contacts registered in an address book application is displayed. The access card may be transferred to the user terminal 1504 selected from the list. At this time, the list may be displayed differently depending on attributes (e.g., a current location of the user terminal, affiliation of the user terminal, a time point when the transfer is requested, etc.) of the user terminal 1501 set by the partner terminal 1501 to be able to receive the access card.

The user terminal 1504 may return the currently issued or transferred access card to the partner terminal 1501 by selecting the menu "Return." "Return" may mean that the access card is provided to the partner terminal in response to the request of the user terminal 1504. "Retrieval" may mean that the access card is provided to the partner terminal in response to the request of the partner terminal 1501.

The transfer history of the access card may be displayed on the interface of FIG. 22B. In the transfer history of the access card, the partner terminal 1501 which produced the access card may be displayed first, and then, the user terminal, to which the access card is issued, and user terminals corresponding to the transferor and the transferee in the transfer/retransfer of the access card may be sequentially displayed. A validity period may refer to a validity period of the authority to enter an offline area or an online area of the partner terminal 1501 through the access card.

The transfer and retrieval described with reference to FIG. 22 have been described as being carried out in response to the request of the user terminal 1504 or the partner terminal 1501, but may be automatically carried out when a particular condition is satisfied or a particular time point arrives. When the transfer is automatically carried out, the access card may be automatically transferred to a user terminal designated by the partner terminal 1501 or the user terminal 1504 corresponding to the transferor.

For example, the transfer condition may include a case where (i) the validity period of the access card is expired, or (ii) a time point designated by the partner terminal 1501 or the user terminal 1504 corresponding to the transferor arrives. In addition, the retrieval condition may include a case where (i) the validity period of the access card is expired, or (ii) a time point designated by the partner terminal 1501 arrives.

Figure 23:
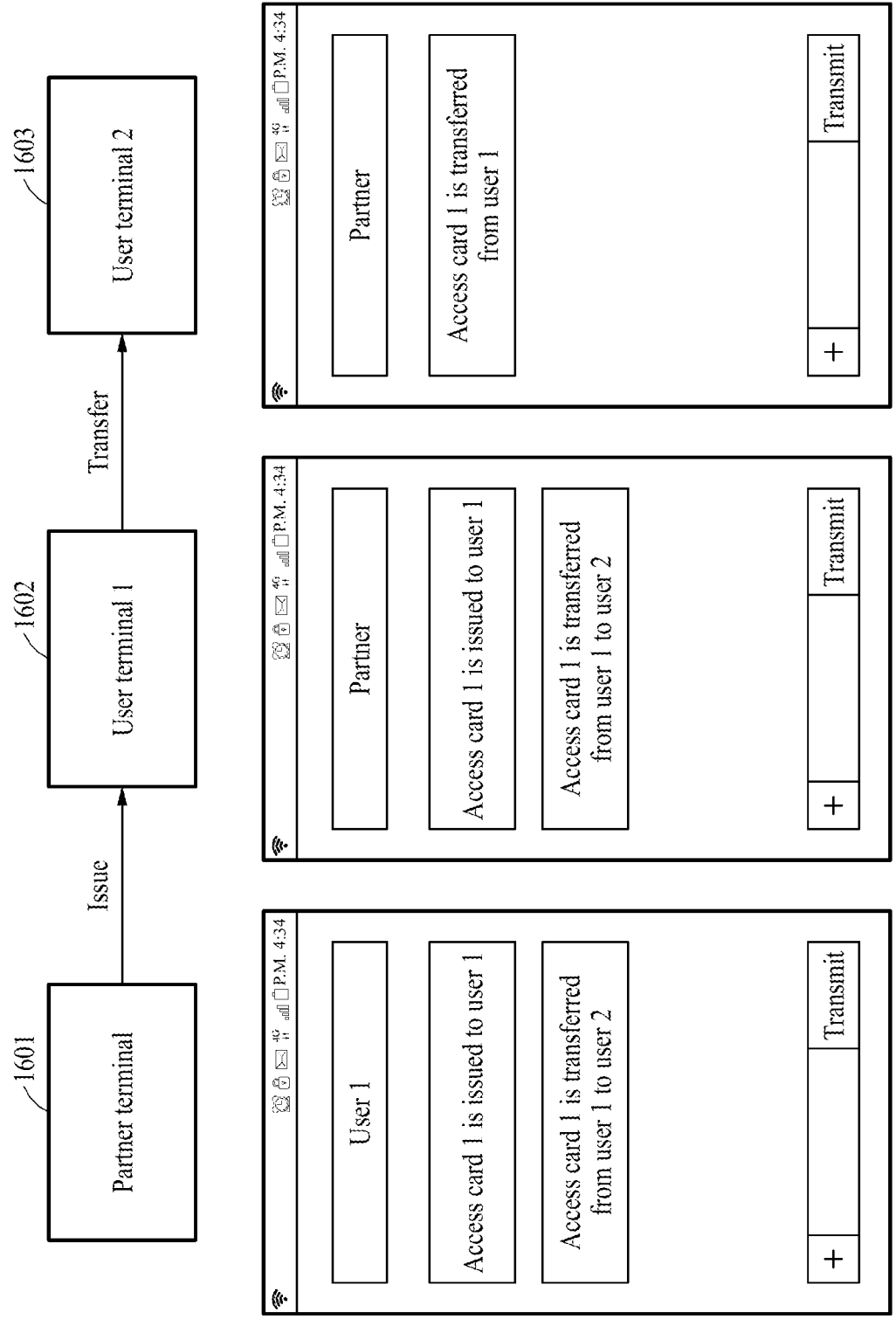
FIG. 23 is a diagram illustrating a message provided when an access card is transferred according to an embodiment of the present disclosure.

FIG. 23 is a diagram illustrating a message provided when an access card is transferred according to an embodiment of the present disclosure.

Referring to FIG. 23, a case where an access card is issued from the partner terminal 1601 to the user terminal 1 1602 will be described. Also, a case where the access card issued to the user terminal 1 1602 corresponding to the transferor is transferred to the user terminal 2 1603 corresponding to the transferee will be described.

When the access card is issued, a message about the issuance of the access card is transmitted to the partner terminal 1601 which produced the access card and the user terminal 1 1602 to which the access card is issued. When the issuance of the access card is completed, an instant message including a notification that the issuance of the access card is completed may be provided to the partner terminal 1501 or the user terminal 1503 through a messenger application. In this case, the message may be provided through a chatroom in which a business entity corresponding to the partner terminal 1501 participates or a chatroom in which a business entity corresponding to the access card management server 1502 participates. A chatroom in which a business entity participates may be identified by a business entity's name or icon. The message about the issuance of the access card may include the type of the access card, an issuance time point of the access card, and information on a user terminal to which the access card is issued.

When the access card is transferred from the user terminal 1 1602 to the user terminal 2 1603, a message about transfer of the access card may be transmitted to the partner terminal 1601 which produced the access card, the user terminal 1 1602 which is the transferor of the access card, and the user terminal 2 1603 which is the transferee of the access card.

When the access card is transferred from the user terminal 1503 to the user terminal 1504, an instant message including information related to the transfer of the access card may be provided to the partner terminal 1501, the user terminal 1503 corresponding to the transferor, and the user terminal 1504 corresponding to the transferee, through a chatroom in which a business entity corresponding to the partner terminal 1501 participates or a chatroom in which a business entity corresponding to the access card management server 1502 participates. The message about the transfer of the access card may include the type of the access card, a transfer time point of the access card, and information on the user terminals related to the transfer of the access card (the transferor and the transferee).

Figure 24:
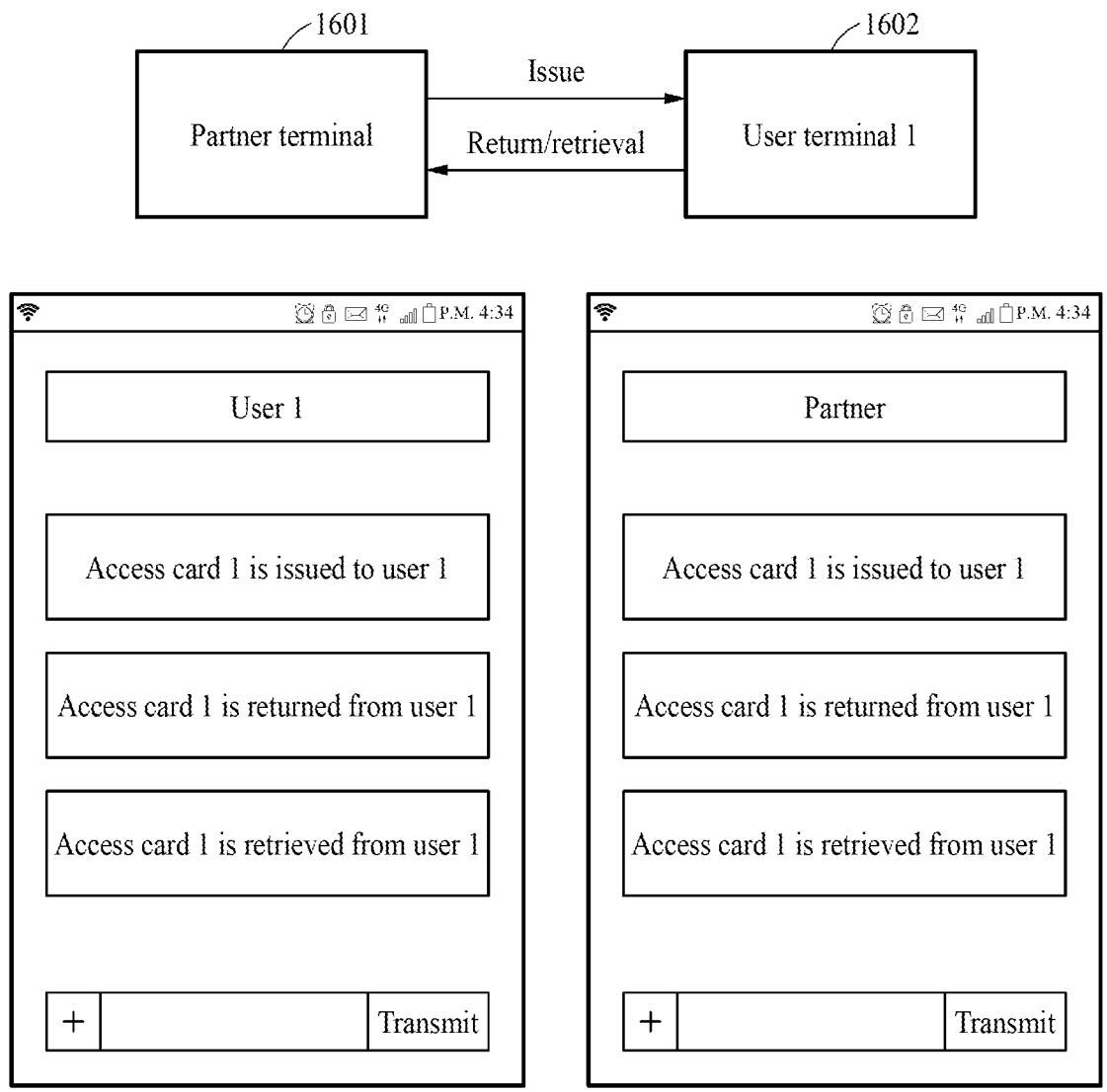
FIG. 24 is a diagram illustrating a message provided when an access card is returned or retrieved according to an embodiment of the present disclosure.

FIG. 24 is a diagram illustrating a message provided when an access card is returned or retrieved according to an embodiment of the present disclosure.

Referring to FIG. 24, a case where an access card is issued from the partner terminal 1601 to the user terminal 1 1602 will be described. Also, a case where the user terminal 1 1602 returns the access card or the partner terminal 1601 retrieves the access card will be described.

When the access card is issued, a message about the issuance of the access card is transmitted to the partner terminal 1601 which produced the access card and the user terminal 1 1602 to which the access card is issued. When the issuance of the access card is completed, an instant message including a notification that the issuance of the access card is completed may be provided to the partner terminal 1501 or the user terminal 1503 through a messenger application. In this case, the message may be provided through a chatroom in which a business entity corresponding to the partner terminal 1501 participates or a chatroom in which a business entity corresponding to the access card management server 1502 participates. A chatroom in which a business entity participates may be identified by a business entity's name or icon. The message about the issuance of the access card may include the type of the access card, an issuance time point of the access card, and information on a user terminal to which the access card is issued.

When the access card is returned by the user terminal 1 1602, a message about the return of the access card is transmitted to the partner terminal 1601 which produced the access card and the user terminal 1 1602 to which the access card is issued. When the access card is returned from the user terminal 1504 to the user terminal 1503, an instant message including information related to the return of the access card may be provided to the partner terminal 1501, the user terminal 1503 corresponding to the transferor, and the user terminal 1504 corresponding to the transferee, through a chatroom in which a business entity corresponding to the partner terminal 1501 participates or a chatroom in which a business entity corresponding to the access card management server 1502 participates. The message about the return of the access card may include the type of the access card, a return time point of the access card, and information on the user terminal which returned the access card.

When the access card is retrieved from the user terminal 1 1602 to the partner terminal 1601 according to a request of the partner terminal 1601 or a satisfied retrieval condition, a message about the retrieval of the access card is transmitted to the partner terminal 1601 which produced the access card and the user terminal 1 1602 to which the access card is issued. When the access card is retrieved from the user terminal 1503, an instant message including information related to the retrieval of the access card may be provided to the partner terminal 1501 and the user terminal 1503 through a chatroom in which a business entity corresponding to the partner terminal 1501 participates or a chatroom in which a business entity corresponding to the access card management server 1502 participates. The message about the retrieval of the access card may include the type of the access card, a retrieval time point of the access card, information on a user terminal which returned the access card, and a reason for the retrieval (the request or the satisfied condition).

The method according to embodiments may be written in a computer-executable program and may be implemented as various recording media such as magnetic storage media, optical reading media, or digital storage media.

Various techniques described herein may be implemented in digital electronic circuitry, processing circuitry, electronic device, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors (or processing circuitry) suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any disclosure or a scope that can be claimed, but rather should be construed as being descriptions of features that may be peculiar to specific embodiments of specific disclosures. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the disclosure, but are not intended to limit the scope of the disclosure. It will be apparent to those skilled in the art that various modifications based on the technical spirit of the present disclosure, as well as the disclosed embodiments, can be made.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An access card processing method performed by an access card management server, the access card processing method comprising:
setting availability of functions for transfer, return, or retrieval of an access card provided by a partner terminal to a user terminal;
receiving a transfer request, a return request, or a retrieval request for the access card according to the setting of the availability of the functions;
processing the access card based on the received transfer request, return request, or retrieval request; and
recording a processing history of the access card,
wherein the access card is a virtual card indicating qualifications to enter an online area or an offline area set by the partner terminal,
wherein an instant message comprising information related to return of the access card is transmitted to at least one of the partner terminal, the user terminal of a first user account corresponding to a transferee, or a user terminal of a second user account corresponding to a transferor, and
wherein the instant message is provided through a chatroom identified as a business entity of the partner terminal or the access card management server.

2. The access card processing method of claim 1,
wherein the receiving of the transfer request, the return request, or the retrieval request for the access card comprises receiving the transfer request from a user terminal of a first user account corresponding to a transferor of the access card, and
wherein the processing of the access card comprises mapping an access card mapped to the first user account to a second user account corresponding to a transferee in response to the transfer request.

3. The access card processing method of claim 2,
wherein an instant message comprising information related to transfer of the access card is transmitted to at least one of the partner terminal, the user terminal of the first user account corresponding to the transferor, or a user terminal of the second user account corresponding to the transferee, and
wherein the instant message is provided through a chatroom identified as a business entity of the partner terminal or the access card management server.

4. The access card processing method of claim 3, wherein the information related to the transfer comprises at least one of a type of the access card related to the transfer, a transfer time point of the access card, or information on the user terminal of the first user account or the user terminal of the second user account.

5. The access card processing method of claim 1,
wherein the receiving of the transfer request, the return request, or the retrieval request for the access card comprises receiving the return request from the partner terminal for the access card or a user terminal of a first user account corresponding to a transferee, and
wherein the processing of the access card comprises mapping an access card mapped to the first user account to a second user account corresponding to a transferor or a user account of the partner terminal in response to the return request.

6. The access card processing method of claim 1, wherein the information related to the return comprises at least one of a type of the access card, a return time point of the access card, or information on the user terminal of the first user account or the user terminal of the second user account.

7. The access card processing method of claim 1,
wherein the receiving of the transfer request, the return request, or the retrieval request for the access card comprises receiving the retrieval request from the partner terminal for the access card or a user terminal of a first user account corresponding to a transferor, and
wherein the processing of the access card comprises mapping an access card mapped to a second user account corresponding to a transferee to the first user account corresponding to the transferor or a user account of the partner terminal in response to the return request.

8. The access card processing method of claim 7,
wherein an instant message comprising information related to retrieval of the access card is transmitted to at least one of the partner terminal, the user terminal of the first user account corresponding to the transferor, or a user terminal of the second user account corresponding to the transferee, and
wherein the instant message is provided through a chatroom identified as a business entity of the partner terminal or the access card management server.

9. The access card processing method of claim 8, wherein the information related to the retrieval comprises at least one of a type of the access card, a retrieval time point of the access card, information on the user terminal of the first user account or the user terminal of the second user account, or a reason for the retrieval.

10. An access card processing method performed by an access card management server, the access card processing method comprising:
setting an execution condition for transfer, return, or retrieval of an access card provided by a partner terminal to a user terminal, from the partner terminal;
determining whether the partner terminal or the user terminal satisfies the execution condition;
processing the access card based on a result of the determining of whether the execution condition is satisfied; and
recording a processing history of the access card,
wherein the access card is a virtual card indicating qualifications to enter an online area or an offline area set by the partner terminal, and
the execution condition for the transfer comprises at least one of time requirements in that the access card is divided temporally and transferred to each of a plurality of user terminals or regional requirements in that the access card is divided regionally and transferred to each of the user terminals according to a set transfer range,
wherein an instant message comprising information related to the return of the access card is transmitted to at least one of the partner terminal, a user terminal of a first user account corresponding to a transferee, or a user terminal of a second user account corresponding to a transferor, and wherein the instant message is provided through a chatroom identified as a business entity of the partner terminal or the access card management server.

11. The access card processing method of claim 10, wherein the processing of the access card comprises:
   mapping an access card mapped to a first user account to a second user account corresponding to a transferee according to the execution condition for the transfer.

12. The access card processing method of claim 11,
   wherein an instant message comprising information related to the transfer of the access card is transmitted to at least one of the partner terminal, a user terminal of the first user account corresponding to a transferor, or a user terminal of the second user account corresponding to the transferee, and
   wherein the instant message is provided through a chatroom identified as a business entity of the partner terminal or the access card management server.

13. The access card processing method of claim 10, wherein the processing of the access card comprises mapping an access card mapped to a first user account to a second user account corresponding to a transferor or a user account of the partner terminal according to the execution condition for the return.

14. The access card processing method of claim 10, wherein the processing of the access card comprises mapping an access card mapped to a second user account corresponding to a transferee to a first user account corresponding to a transferor or a user account of the partner terminal according to the execution condition for the return.

15. The access card processing method of claim 14,
   wherein an instant message comprising information related to retrieval of the access card is transmitted to at least one of the partner terminal, a user terminal of the first user account corresponding to the transferor, or a user terminal of the second user account corresponding to the transferee, and
   wherein the instant message is provided through a chatroom identified as a business entity of the partner terminal or the access card management server.

16. A system comprising:
   a processor configured to:
   set availability of functions for transfer, return, or retrieval of an access card provided by a partner terminal to a user terminal;
   receive a transfer request, a return request, or a retrieval request for the access card according to the setting of the availability of the functions;
   process the access card based on the received transfer request, return request, or retrieval request; and
   record a processing history of the access card,
   wherein the access card is a virtual card indicating qualifications to enter an online area or an offline area set by the partner terminal,
   wherein an instant message comprising information related to return of the access card is transmitted to at least one of the partner terminal, a user terminal of a first user account corresponding to a transferee, or a user terminal of the second user account corresponding to a transferor, and
   wherein the instant message is provided through a chatroom identified as a business entity of the partner terminal or the access card management server.

17. The system of claim 16,
   wherein the receiving of the transfer request, the return request, or the retrieval request for the access card comprises receiving the transfer request from a user terminal of a first user account corresponding to a transferor of the access card, and
   wherein the processing of the access card comprises mapping an access card mapped to the first user account to a second user account corresponding to a transferee in response to the transfer request.

18. The system of claim 17,
   wherein an instant message comprising information related to transfer of the access card is transmitted to at least one of the partner terminal, the user terminal of the first user account corresponding to the transferor, or a user terminal of the second user account corresponding to the transferee, and
   wherein the instant message is provided through a chatroom identified as a business entity of the partner terminal or the access card management server.

* * * * *